(12) United States Patent
Odagiri et al.

(10) Patent No.: US 8,306,341 B2
(45) Date of Patent: Nov. 6, 2012

(54) IMAGE DATA COMPRESSION APPARATUS AND DECODING APPARATUS

(75) Inventors: Junichi Odagiri, Kawasaki (JP); Shigeru Yoshida, Gamagori (JP)

(73) Assignee: Fujitsu Limited, Kawasaki (JP)

( * ) Notice: Subject to any disclaimer, the term of this patent is extended or adjusted under 35 U.S.C. 154(b) by 479 days.

(21) Appl. No.: 12/568,099

(22) Filed: Sep. 28, 2009

(65) Prior Publication Data
US 2010/0080479 A1 Apr. 1, 2010

Related U.S. Application Data

(63) Continuation of application No. PCT/JP2007/000339, filed on Mar. 30, 2007.

(51) Int. Cl.
*G06K 9/36* (2006.01)
*H04N 11/02* (2006.01)

(52) U.S. Cl. ............. 382/233; 382/238; 348/398.1; 348/411.1

(58) Field of Classification Search ............. 382/232, 382/233, 238; 348/409.1, 398.1, 411.1; 375/240.12
See application file for complete search history.

(56) References Cited

U.S. PATENT DOCUMENTS

| | | | | |
|---|---|---|---|---|
| 5,287,200 A | * | 2/1994 | Sullivan et al. | 382/251 |
| 5,657,085 A | * | 8/1997 | Katto | 348/398.1 |
| 5,748,786 A | | 5/1998 | Zandi et al. | |
| 5,777,678 A | * | 7/1998 | Ogata et al. | 375/240.11 |
| 5,881,176 A | | 3/1999 | Keith et al. | |
| 2004/0202375 A1 | | 10/2004 | Kalevo | |
| 2004/0223549 A1 | * | 11/2004 | Karczewicz et al. | 375/240.16 |
| 2010/0027901 A1 | * | 2/2010 | Feria | 382/238 |

FOREIGN PATENT DOCUMENTS

| | | |
|---|---|---|
| JP | 59-61279 | 4/1984 |
| JP | 63-280576 | 11/1988 |
| JP | 4-20115 | 1/1992 |
| JP | 2005-218124 | 8/2005 |
| JP | 2006-517065 | 7/2006 |
| JP | 2006-270392 | 10/2006 |
| WO | 2007/010690 A1 | 1/2007 |

OTHER PUBLICATIONS

Partial English Translation of JP 63-280576.

(Continued)

*Primary Examiner* — Jon Chang
(74) *Attorney, Agent, or Firm* — Staas & Halsey LLP

(57) ABSTRACT

An image data compression apparatus includes: a filter coefficient calculation unit to perform a filter process to separate pixels extracted in accordance with a one-dimensional subband coding into low- and high-frequency components, and to calculate coefficient values of respective filter coefficients; prediction units to perform different predictions respectively for the calculated coefficient values; a predicted coefficient value calculation unit to calculate predicted coefficient values to be used for posterior predictions by calculating each from at least one of predicted values and from corresponding at least one of the calculated coefficient values; a memory unit to hold the predicted coefficient values calculated by the predicted coefficient value calculation unit; and a compression coding unit to calculate a difference between each predicted value and corresponding each coefficient value, and to perform coding after quantizing the difference, or to perform coding on the basis of the difference.

9 Claims, 20 Drawing Sheets

OTHER PUBLICATIONS

Japanese Office Action issued Jan. 18, 2011 in corresponding Japanese Patent Application 2009-508693.
Ali Habibi, "Hybrid Coding of Pictorial Data", IEEE Transactions on Comunications, vol. COM-22, No. 5, May 1974, pp. 614-623.
"From Orthogonal Transform to Wavelet"; printed Mar. 20, 2007 from tech.nagaokaut.ac.jp/lecturenote/H14GRAD_PDF/NOTE11. PDF.
W.K. Pratt et al., "Slant Transform Image Coding", IEEE Transactions on Comunications; vol. COM-22, No. 8, Aug. 1974; pp. 1075-1093.
Kunitoshi Komatsu et al., "Reversible Transform Coding of Image", The Transactions of the Institute of Electronics, Information and Communication Engineers, A vol. J79-A, No. 4, Apr. 1996, pp. 981-990.

* cited by examiner

BASIS FUNCTIONS OF
ORTHOGONAL TRANSFORM

BASIS FUNCTIONS OF HAAR WAVELET TRANSFORM

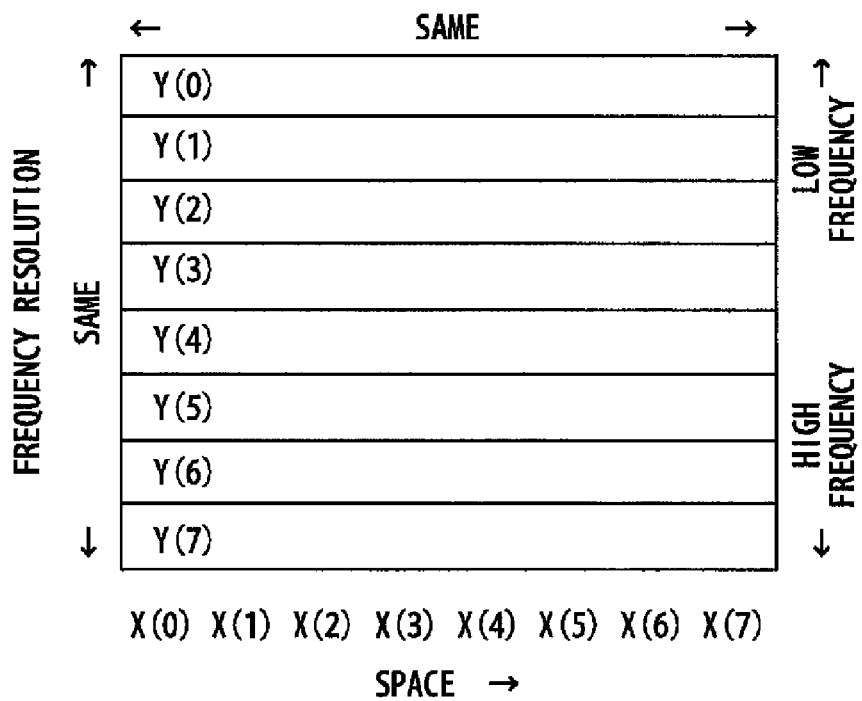
F I G. 2A

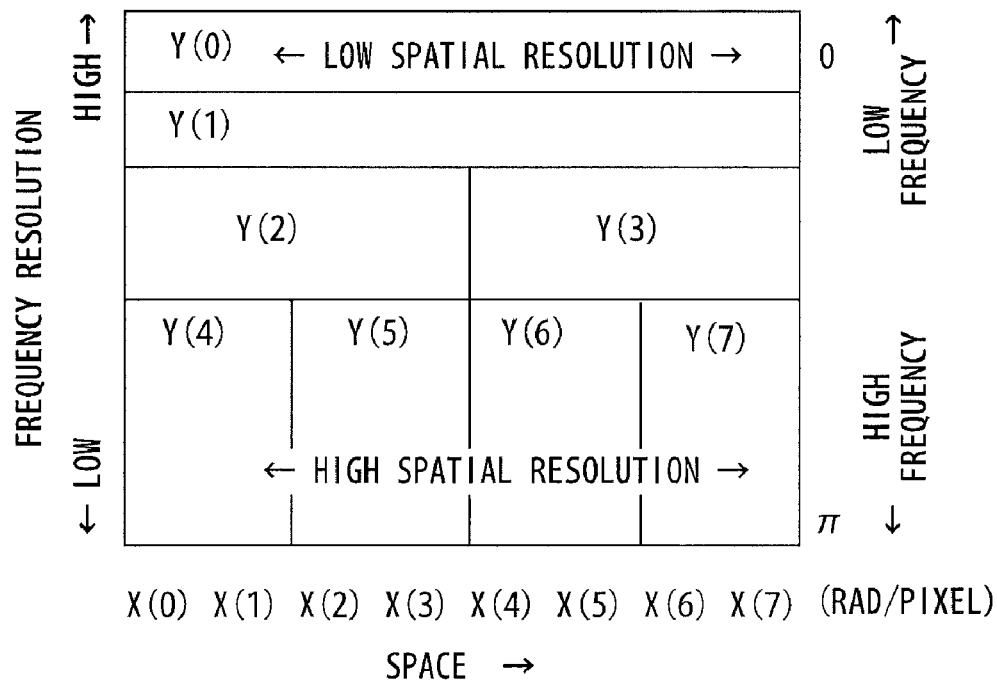
F I G. 2 B

| x0 | x1 | x2 | x3 |

PRIOR ART

PREDICTED VALUE X' IS INTERMEDIATE VALUE OF A', C, A'+C−B'
WHERE A'+C−B' IS (A+2C−B+1)/2

F I G. 8

| PREDICTION ERROR | QUANTIZED VALUE OF PREDICTION ERROR | QUANTIZATION NUMBER |
|---|---|---|
| -21~ | -28 | 7 |
| -8 ~ -20 | -12 | 5 |
| -3 ~ -7 | -4 | 3 |
| -2 ~ 2 | 0 | 1 |
| 3 ~ 7 | 4 | 2 |
| 8 ~ 20 | 12 | 4 |
| 21~ | 28 | 6 |

FIG. 10

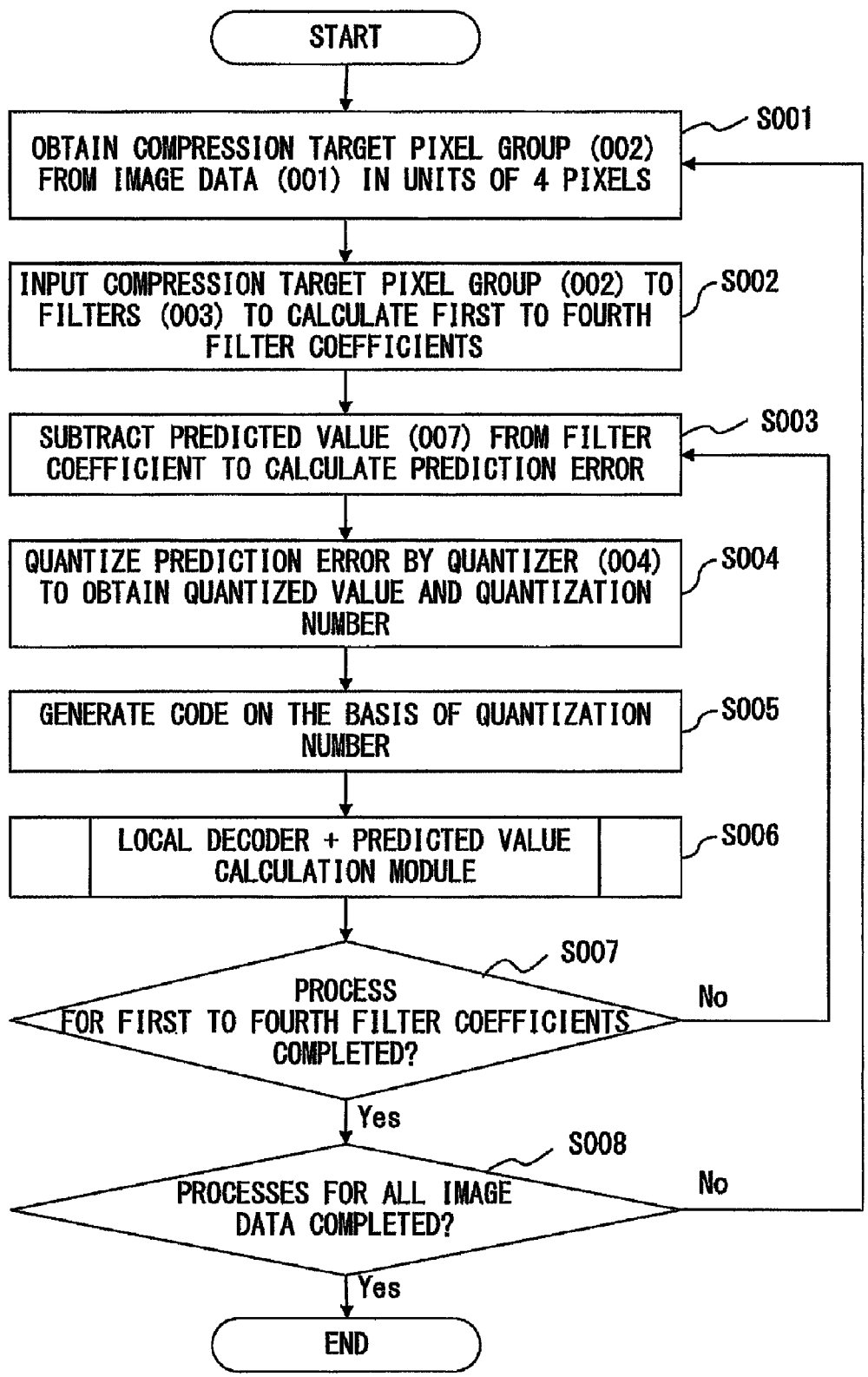
F I G. 1 1

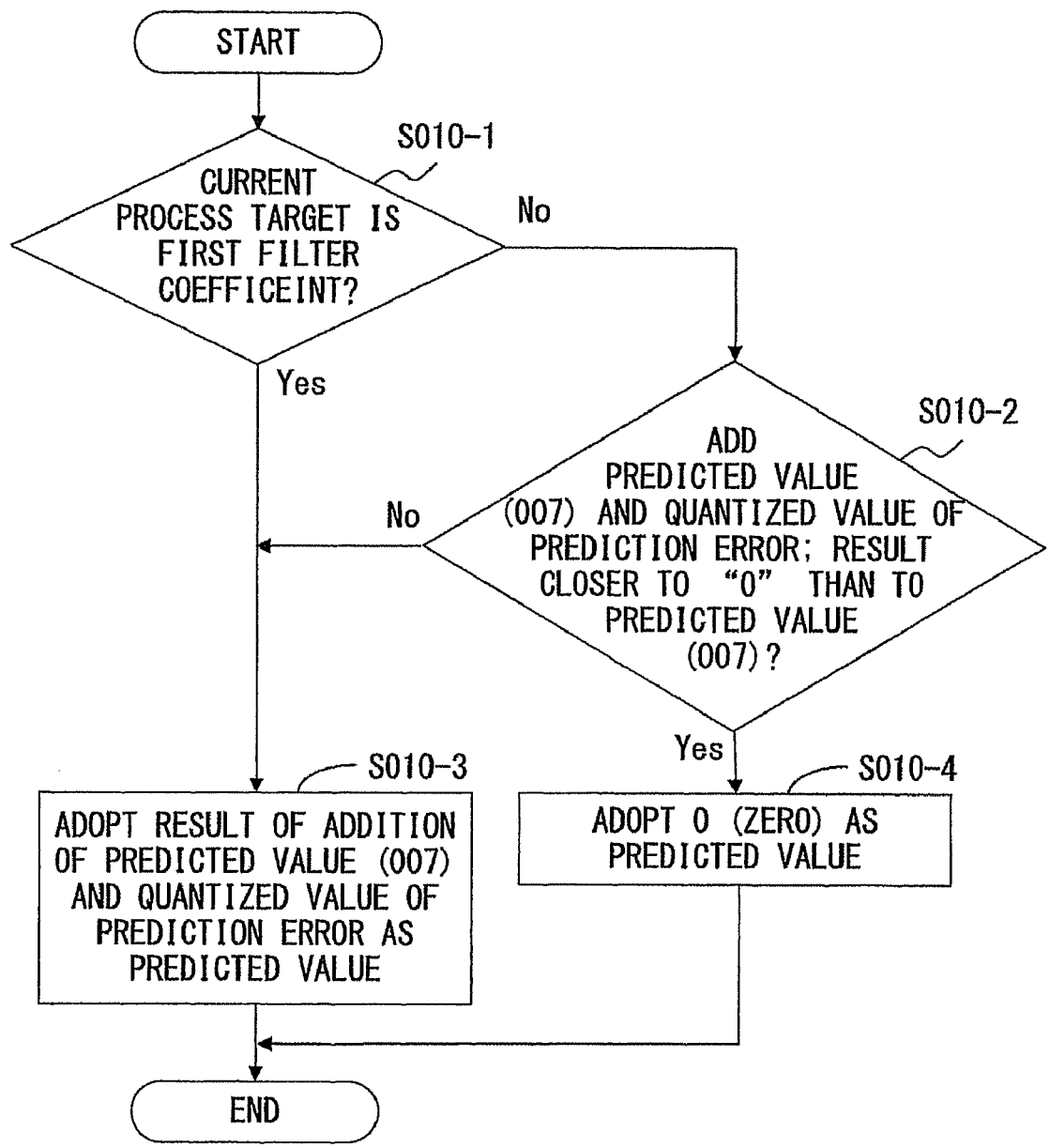
F I G. 1 3

| QUANTIZATION NUMBER | QUANTIZED VALUE OF PREDICTION ERROR |
|---|---|
| 7 | −28 |
| 5 | −12 |
| 3 | −4 |
| 1 | 0 |
| 2 | 4 |
| 4 | 12 |
| 6 | 28 |

FIG. 15

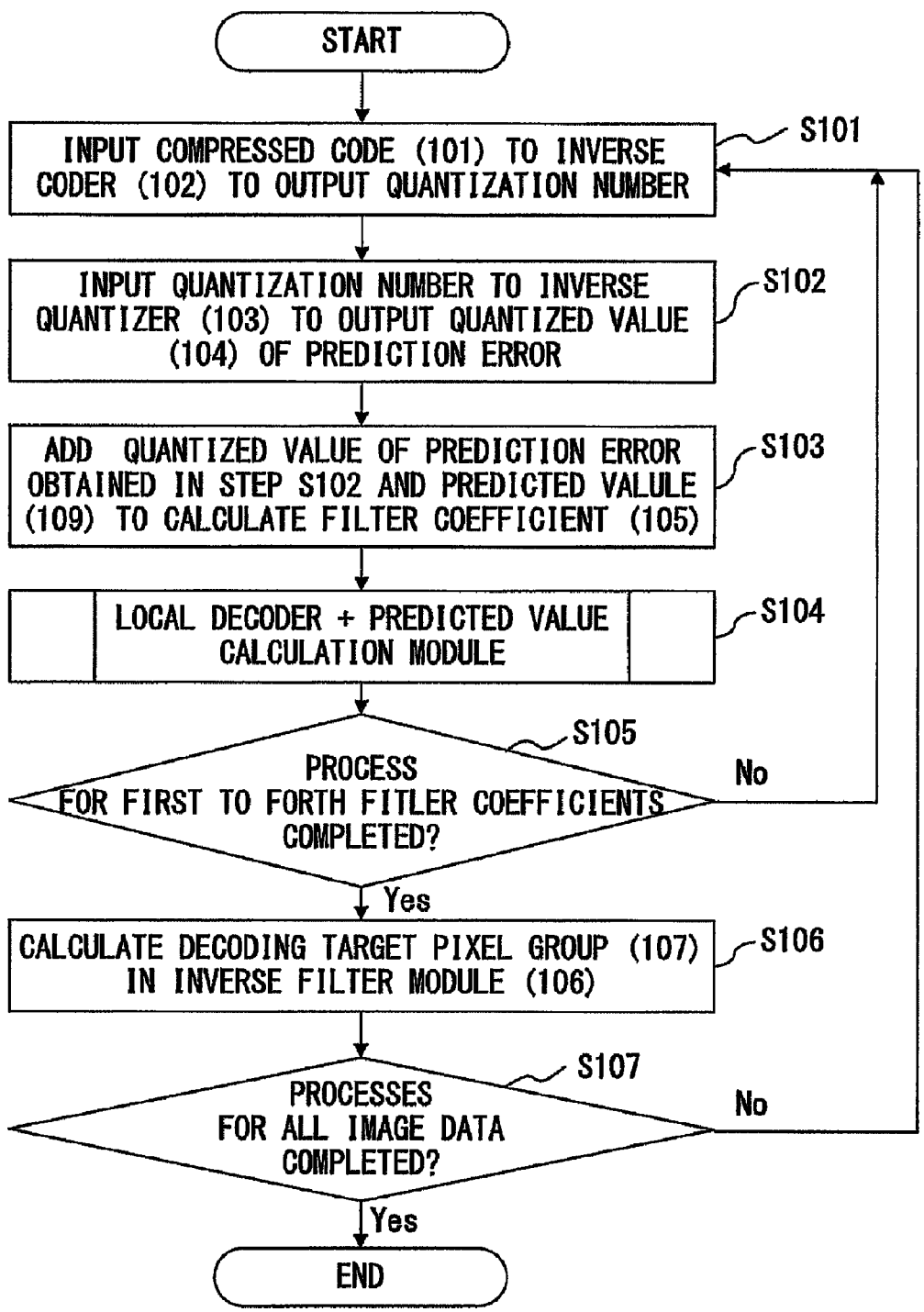
F I G. 16

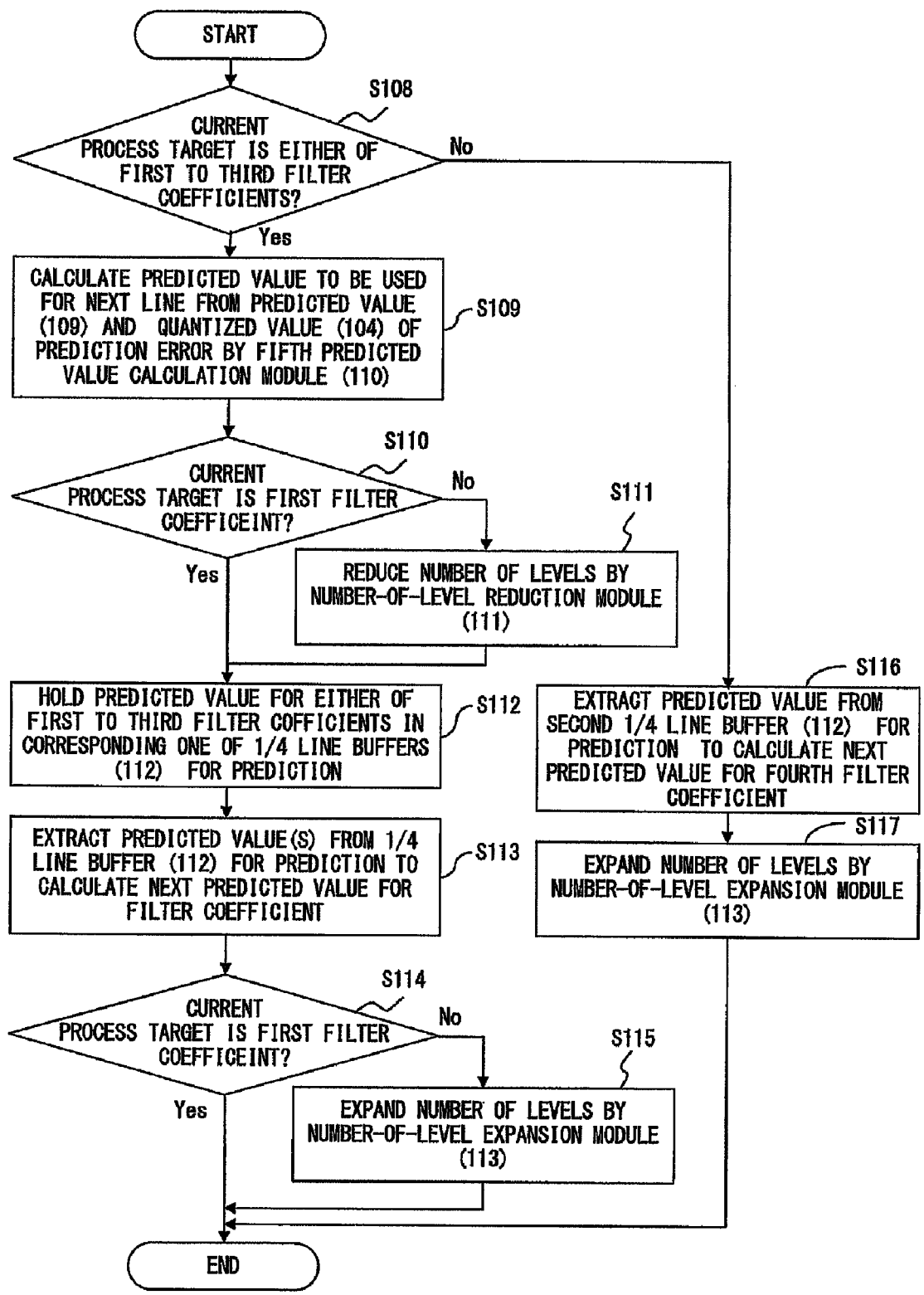
F I G. 1 7

IMAGE DATA COMPRESSION APPARATUS AND DECODING APPARATUS

CROSS-REFERENCE TO RELATED APPLICATION

This application is a continuation of PCT application PCT/JP2007/000339, which was filed on Mar. 30, 2007, and the entire contents of which are incorporated herein by reference.

FIELD

The embodiments discussed herein are related to an image data compression apparatus compressing image data by one-dimensional subband coding and a decoding apparatus.

BACKGROUND

In recent years, the automobile industry attempts to implement an in-vehicle system in an automobile in such a manner that a display of an in-vehicle terminal is installed not only on the front seat (i.e., anterior seat) but also on the rear seat (i.e., backseat). By so doing, images on a DVD (digital versatile disk) or car-navigation system can be viewed on both the front seat and the rear seat via an in-vehicle LAN (local area network). In order to implement such an in-vehicle system, it may be preferable to reduce at least one of the band of image data to be transmitted, the size of a circuit to be realized, and a delay in the transmission. The reduced delay will also be preferable in the future where advanced safety is achieved by transmitting an image captured by an in-vehicle camera.

The standardized compression system currently used is made so as to encode image data by two-dimensional subband coding regarding a high compression rate as most important, and has not been sufficient to reduce a circuit size or delay amount so as to be preferable for in-vehicle installment.

In order to satisfy the conditions related to, for example, the above-mentioned preferable circuit size and reduced delay, reduction in the memory usage or reduction in the size of the unit processed in compression may be important. For this reason, an algorithm that performs the compression process using a memory corresponding to about one line, not the compression process in units of blocks, is preferable. As techniques for performing the compression process using a line memory, following techniques have been known.

A certain technique uses one-dimensional orthogonal transform to (1) obtain the low-order conversion coefficient to quantize the difference between the obtained low-order conversion coefficient and the similar coefficient of the immediately preceding line, followed by variable length coding and to (2) obtain a high-frequency component as the difference between the image corresponding to the quantized low-order conversion coefficient and the original image, followed by quantization and variable length coding of the obtained high-frequency component.

Since the system involves the one-dimensional process only, there is an advantage that the memory amount that significantly influences the LSI (large scale integration) circuit size can be reduced. Furthermore, high compression can be attained as two-dimensional correlation is also used by obtaining the difference between the current line and the immediately preceding line.

In addition, since the quantization and encoding are performed separately for the low-frequency component of (1) and the high-frequency component of (2), the quantizers can be designed in accordance with the respective components, making it possible to effectively reduce visual redundancy. In other words, in view of the characteristics of vision, smoothness of gradation is important for the low-frequency component, and rough resolution can be ignored. On the other hand, the resolution is important for the high-frequency component, and rough gradation can be ignored. The quantization can be performed in accordance with this characteristic of vision.

Wavelet transform coding is described below, while it does not assume a compression process using a memory of one line only. Wavelet transform coding is also used for JPEG (Joint Photographic Experts Group) 2000 instead of the orthogonal transform coding used in the above-explained technique.

Wavelet transform coding is a technique for performing coding after dividing an image for every spatial-frequency band. According to the method, in the image domain, usually, the band division is sequentially performed using low-pass filters to make the band half. In addition, the method is also realized as transform coding in the frequency domain by using basis functions that correspond to the respective bands.

Haar wavelet transform is a simple example of the transformation in the frequency domain in the wavelet transform. FIGS. 1A and 1B illustrate and compares basis functions for an eight-pixel block; those of the orthogonal transform are illustrated in FIG. 1A and those of Haar wavelet transform are illustrated in FIG. 1B.

Wavelet transform uses scaling functions and analyzing functions, and when the functions are added together, the basis functions as illustrated in FIG. 1B are obtained.

The orthogonal transform and the wavelet transform have a difference in characteristics as illustrated in FIGS. 2A and 2B. That is, in the orthogonal transform (see FIG. 2A), the frequency resolution of each coefficient after the transformation is the same across the entire block of pixels, and the spatial resolution of each coefficient after the transformation is the same across the entire block of pixels. On the other hand, in the wavelet transform (see FIG. 2B), the frequency resolution is higher and the spatial resolution is lower for a lower frequency component, and the frequency resolution is lower and the spatial resolution is higher for a higher frequency component. In the wavelet transform, "octave decomposition" of the band is sequentially performed from layer to layer to make the spatial resolution ½ and to double the frequency resolution.

This feature of the wavelet transform matches a characteristic of vision. Human eyes are sensitive to even a small gradation change that represents smoothness in a part in which the gradation change is smooth (namely, in which the gradation change corresponds to a low-frequency component), but become less sensitive to the spatial position. On the contrary, in the edge part of a line image (namely, in a part corresponding to a high-frequency component), human eyes are less sensitive to the gradation change but sensitive to the special position of the edge. According to the wavelet transform coding, the image quality can be adjusted in accordance with the characteristics of vision using this feature to obtain a high compression rate.

Specifically, as illustrated in FIG. 3, a filtering process for the first layer is performed for an original image 31 to separate it into two bands of a high frequency (H1) 32 and a low frequency (L1) 33. Then, in a phased manner, a filtering process for the second layer is performed for the low frequency (L1) 33 to separate it into a high frequency (H2) 34 and a low frequency (L2) 35.

The above-mentioned steps are the same as those in DCT (Discrete Cosine Transform) in that the compression is performed by applying the fact that frequency components of an image generally concentrate at low frequencies. However, the filtering is not performed for the high-frequency component (H1) 32 again in the wavelet transform as illustrated in FIG. 3. For this reason, an advantage that mosquito noises do not easily stick out is obtained because the high-frequency component is not expressed in units of many pixels, e.g., not expressed in units of eight pixels as in JPEG (Joint Photographic Experts Group).

However, since a large number of pixels are used for the filtering process for the low-frequency side, there is a problem that the transformation result does not settle within 8 bits and the compression process using a memory corresponding to one line is difficult. For example, the filters used for the lossless JPEG2000 are as follows.

$x'_i = -0.5x_{i-1} + x_i - 0.5x_{i+1}$     High-frequency filter H(x):

$x'_{2i} = -(1/8)x_{2i-2} + (1/4)x_{2i-1} + (3/4)x_{2i} + (1/4)x_{2i+1} - (1/8)x_{2i+2}$     Low-frequency filter L(x):

Meanwhile, compression using the slant transform is also known. The compression performance of the slant transform (SLT) is regarded as approximately the same as that of the DCT described above, and regarding the computation complexity, the computation complexity can be reduced compared to that of the DCT by using approximate calculation for the division. For example, the SLT matrix for the horizontally-aligned four pixels illustrated in FIG. 4 is as illustrated in FIG. 5. In the SLT matrix for the horizontally-aligned four pixels, the transformation result by the first row represents the flat component and the transformation result by the second row represents the simple slant component. Note that the flat and simple slant components are generally regarded as important components for a natural image.

Meanwhile, simple transformation that adopts the mean value of two pixels as the low-frequency filter and the differential value of two pixels as the high-frequency component exists in techniques such as Haar wavelet transform described above. However, it is known that an attempt to improve the compression rate with such filters causes significant degradation of image quality.

In addition, a technique performing filtering as described below for four pixels is known.

rounddown$((x_0+x_1+x_2+x_3)/4+0.5)$ rounddown$((x_0-x_1-x_2+x_3)/2)$ $x_0-x_3$ $x_1-x_2$ where rounddown (x) is a maximum integer that does not exceed x (where x is a real number)

The above technique focuses on the fact that transformation and inverse transformation can be performed for the differential signal (i.e., high-frequency component) and the integerized mean value (i.e., low-frequency component) even if more than two pixels are used to calculate the differential signal and the integerized mean value.

Another technique is also known in which the above filtering is modified to perform filtering capable of pseudo-discrete cosine transform.

In the techniques described above, Haar wavelet transform with which the computation complexity is reduced has a feature that can provide conformity with the characteristics of vision. However, Haar wavelet transform has a problem that the image quality is degraded in a natural image having smooth gradation, because it uses stair-like step functions as basis functions.

In the wavelet transform, in addition to a method for transforming an image into the frequency domain, there is a method for creating images having different resolutions by dividing spatial-frequency band in the pixel domain using low-pass filters. However, the latter method has a problem that the computation complexity and the memory usage are increased. It has yet another problem that coefficients having different degrees of importance cannot be obtained to be utilized for the data amount compression as in the transformation into the frequency domain.

In addition, there is a problem that with a simple filtering or a small filter size (i.e., a small number of pixels used for the calculation of coefficients), it is difficult to obtain the correlation between pixels and improvement of the compression rate is difficult.

Non-patent document 1: ALI HABIBI, "Hybrid Coding of Pictorial Data", IEEE Trans. on Commun. Vol. COM-22, No. 5, pp. 1075, May. 1974

Non-patent document 2: "From Orthogonal Transform to Wavelet" found at tech.nagaokaut.ac.jp/lecturenote/H14GRAD_PDF/NOTE11.PDF (access confirmation: 20 Mar. 2007)

Non-patent document 3: W. K. Pratt. W-H. Chen, L. R. Welch, "Slant Transform Image Coding", IEEE Trans. on Commun. Vol. COM-22, No. 8, pp. 1075, August 1974

Patent document 1: Japanese Laid-open Patent Publication No. 04-020115

Non-patent document 4: Komatsu, Kunitoshi and Sezaki, Kaoru. Noutan gazou no kagyakuteki na henkanfugouka [Reversible transform coding of images]. *The Transactions of the Institute of Electronics, Information and Communication Engineers*. A Vol. J79-A, No. 4, pp. 981-990, April 1996.

SUMMARY

An image data compression apparatus compressing image data by one-dimensional subband coding is provided. The image data compression apparatus includes:

a filter coefficient calculation unit configured
to perform a filter process to separate a predetermined plurality of pixels extracted in accordance with the one-dimensional subband coding into a low-frequency component and a high-frequency component, and
to calculate coefficient values of respective filter coefficients of the separated low-frequency component and the high-frequency component;

a plurality of prediction units configured to perform different predictions respectively for the coefficient values of the respective filter coefficients calculated by the filter coefficient calculation unit;

a predicted coefficient value calculation unit configured to calculate predicted coefficient values to be used for posterior predictions by calculating each of the predicted coefficient values from at least one of predicted values having been predicted by a corresponding one of the plurality of prediction units and from corresponding at least one of the coefficient values of the respective filter coefficients that the filter coefficient calculation unit has calculated;

a memory unit configured to hold the predicted coefficient values calculated by the predicted coefficient value calculation unit; and a compression coding unit configured
to calculate a difference between each of the predicted values having been predicted by each of the plurality of prediction units and corresponding each of the coefficient values of the respective filter coefficients that the filter coefficient calculation unit has calculated, and
to perform coding after quantizing the difference, or to perform coding on the basis of the difference.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2A is a diagram illustrating the frequency resolution and the spatial resolution of the orthogonal transform.

FIG. 2B is a diagram illustrating the frequency resolution and the spatial resolution of the wavelet transform for comparison with FIG. 2A.

FIG. 4 is a diagram illustrating a model of four pixels of focus aligned in the horizontal direction.

FIG. 8 is a diagram for obtaining a predicted value for the first filter coefficient (X) in accordance with FIG. 7.

FIG. 10 is a diagram illustrating a quantization table in a quantizer according to the first embodiment.

FIG. 11 is a diagram illustrating a flowchart for explaining the operation of the image data compression apparatus according to the first embodiment.

FIG. 13 is a flowchart illustrating detailed process contents in step S010 described in FIG. 12.

FIG. 15 is a diagram illustrating an inverse quantization table in an inverse quantizer according to the second embodiment.

FIG. 16 is a diagram illustrating a flowchart for explaining the operation of the image data decoding apparatus according to the second embodiment.

FIG. 17 is a flowchart illustrating the contents of a subroutine process in step S104 described in FIG. 16.

DESCRIPTION OF EMBODIMENTS

Hereinafter, the embodiments are described with reference to the drawings.
[Outline Description]
Before starting detailed description, the outline configuration of an image data compression apparatus of the first embodiment is described. The first embodiment described below differs from JPEG and JPEG 2000 that perform compression coding of image data by the two-dimensional subband coding. An image data compression apparatus of the first embodiment may be installed in an in-vehicle system, mobile phone and so on to enable image compression with a light load, low delay amount and high image quality with compressing image data by one-dimensional subband coding.

When compressing image data by one-dimensional subband coding, in the first embodiment, a filter process is first performed to separate a predetermined plurality of pixels extracted from the image data in accordance with the one-dimensional subband coding into a low-frequency component and a high-frequency component, and coefficient values of respective separated filter coefficients are calculated. In the first embodiment, a predictor is provided that has prediction units performing different predictions respectively for the calculated coefficient values of the respective filter coefficients of the low-frequency component and the high-frequency component.

In the first embodiment, predicted coefficient values to be used for posterior predictions are calculated from the predicted values, which have been predicted by the respective prediction units as values of the respective filter coefficients of the low-frequency component and the high-frequency component, and from the calculated coefficient values of the respective filter coefficients of the low-frequency component and the high-frequency component. The calculated predicted coefficient values are held in a memory.

Then, in the first embodiment, a difference between each predicted value and each of the currently calculated coefficient values of the respective filter coefficients is calculated. Coding (i.e., encoding) is performed after quantizing the difference, or coding is performed on the basis of the difference. For the prediction of the filter coefficient of the high-frequency component, filter coefficient prediction based on slant transform (SLT) is performed. In predicting filter coefficients, the predictions are performed while switching between different prediction units for the respective filter coefficients as described above.

The above configuration makes it possible to realize prediction with a small prediction error with low computation complexity, and can improve the image quality and compression rate even for the compression of image data adopting one-dimensional subband coding.

Figure 6:
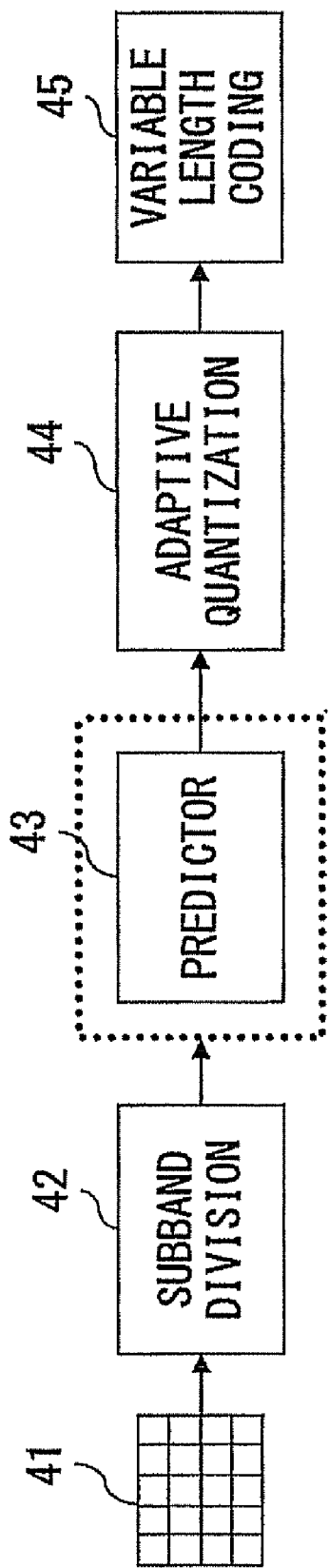
FIG. 6 is a block diagram illustrating an outline configuration of an image data compression apparatus according to a first embodiment.

FIG. 6 is a diagram illustrating the outline configuration of an image data compression apparatus of the first embodiment. In FIG. 6, image data 41 is divided into one-dimensional subbands by a subband division unit 42, and wavelet transform filter coefficients described below are calculated. A predictor 43 calculates predicted values for the calculated wavelet transform filter coefficients while switching prediction methods for each filter coefficient in order to reduce the prediction error. An adaptive quantization unit 44 adaptively quantizes the predicted values output from the predictor 43. A variable length coding unit 45 encodes the adaptively quantized predicted values.

As illustrated in FIG. 6, in the image data compression apparatus of the first embodiment, the subband division unit 42 divides the image data 41 into the low-frequency component and the high-frequency component by a filter process in accordance with the one-dimensional subband coding. At this time, as also described in non-patent documents 1-3 mentioned above, the wavelet transform filter coefficients may be calculated by the filter process. As the wavelet transform filter coefficients, first to fourth filter coefficients are calculated for the horizontally-aligned four pixels ($x_0, x_1, x_2, x_3$) illustrated in FIG. 4. The first filter coefficient is calculated according to the equation (1) below.

$$\text{rounddown}((x_0+x_1+x_2+x_3)/4+0.5) \quad (1)$$

where rounddown (x) represents a maximum integer that does not exceed x (where x is a real number).

Figure 1:
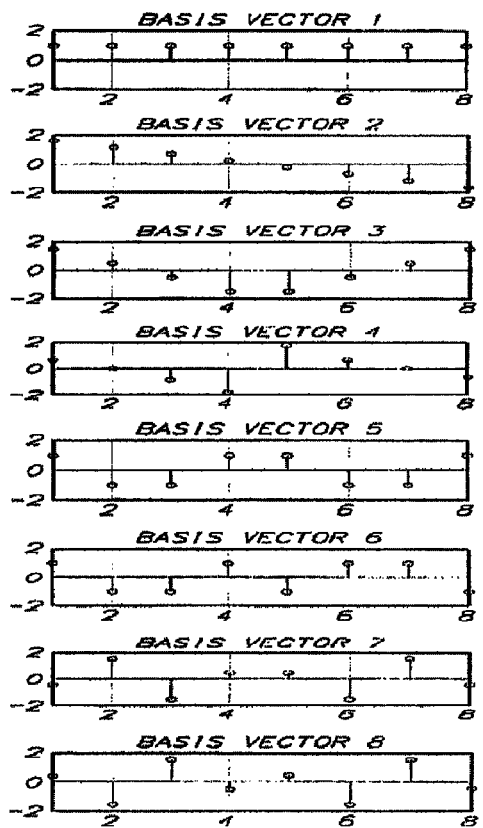
FIG. 1A is a diagram illustrating basis functions of the orthogonal transform.
FIG. 1B is a diagram illustrating basis functions of the wavelet transform for comparison with FIG. 1A.
Figure 1:
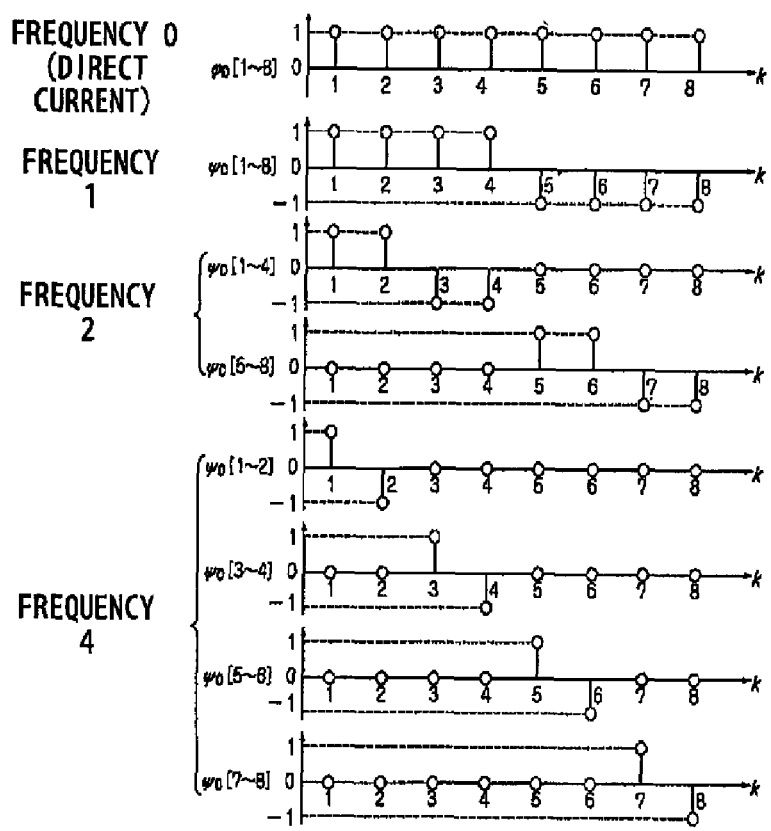
Figure 3:
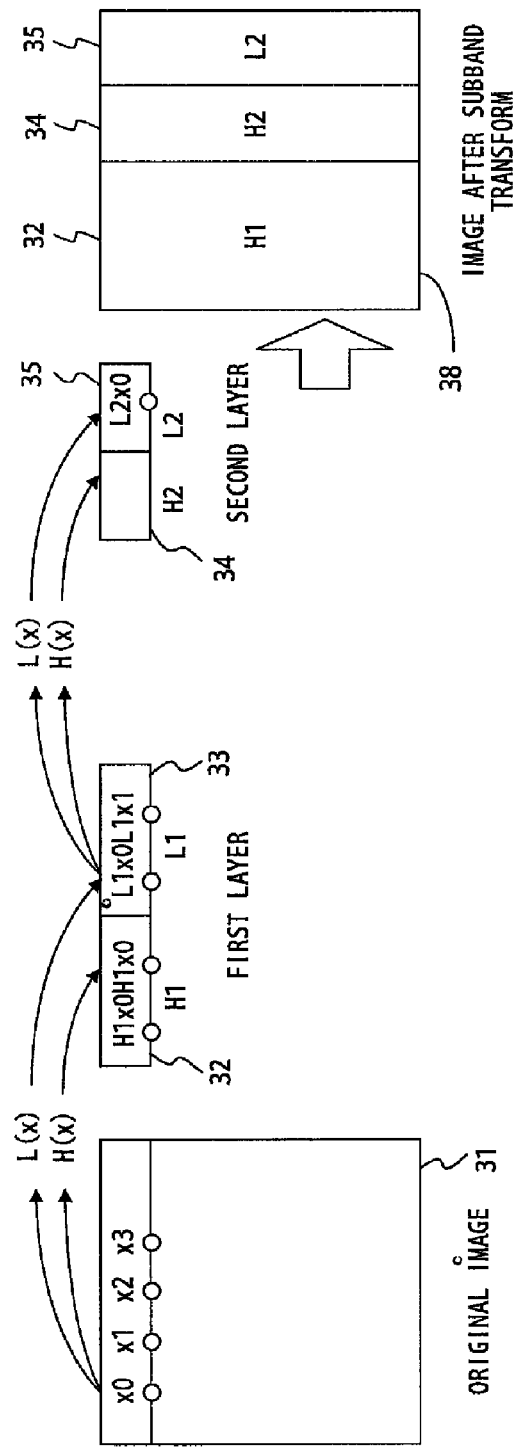
FIG. 3 is a diagram illustrating a difference between an original image and an image after one-dimensional subband trans form.
Figure 5:
FIG. 5 is a diagram illustrating an SLT matrix for the four pixels in FIG. 4 and a schematic diagram that describes the matrix.

The first coefficient is the mean of the respective values of the horizontally-aligned four pixels (i.e., the first coefficient is a low-frequency component); and corresponds to the first row in the SLT matrix illustrated in FIG. 5.

The second filter coefficient is calculated according to the equation (2) below.

$$x_0-x_3 \quad (2)$$

The second filter coefficient represents the slant component (i.e., high-frequency component) of the image together with the fourth filter coefficient described later. The second and fourth filter coefficients correspond to the second and fourth rows in the SLT matrix illustrated in FIG. 5.

The third filter coefficient is calculated according to the equation (3) below.

$$((x_0-x_1-x_2+x_3)/2) \quad (3)$$

where rounddown (x) represents a maximum integer that does not exceed x (where x is a real number)

The third filter coefficient corresponds to the third row in the SLT matrix illustrated in FIG. 5, and takes a large value when an uneven slant exists in the vertical direction.

The fourth filter coefficient is calculated according to the equation (4) below.

$$x_1-x_2 \quad (4)$$

The fourth, filter coefficient represents the slant component (i.e., high-frequency component) of the image together with the second filter coefficient. The second and fourth filter coefficients correspond to the second and fourth rows of the SLT matrix illustrated in FIG. 5. The advantage of the fourth filter coefficient is that while the SLT described in non-patent document 2 uses four pixels for the calculation of the coefficient for the high-frequency component, the fourth filter coefficient is calculated using two pixels only, so mosquito noises are less likely to occur.

The predictor 43 calculates predicted values for the calculated filter coefficients while switching prediction methods for each filter coefficients in order to reduce the prediction error as described below.

For the prediction of the filter coefficients, prediction focusing on the elements of the first and second rows in the SLT matrix illustrated in FIG. 5 is performed. It is because the transformation result by the first row of the SLT matrix defined for a four-pixel unit represents the flat component and the transformation result by the second row of the SLT matrix represents the simple slant component, and generally, the flat and simple slant components are regarded as the important components for a natural image.

Figure 7:
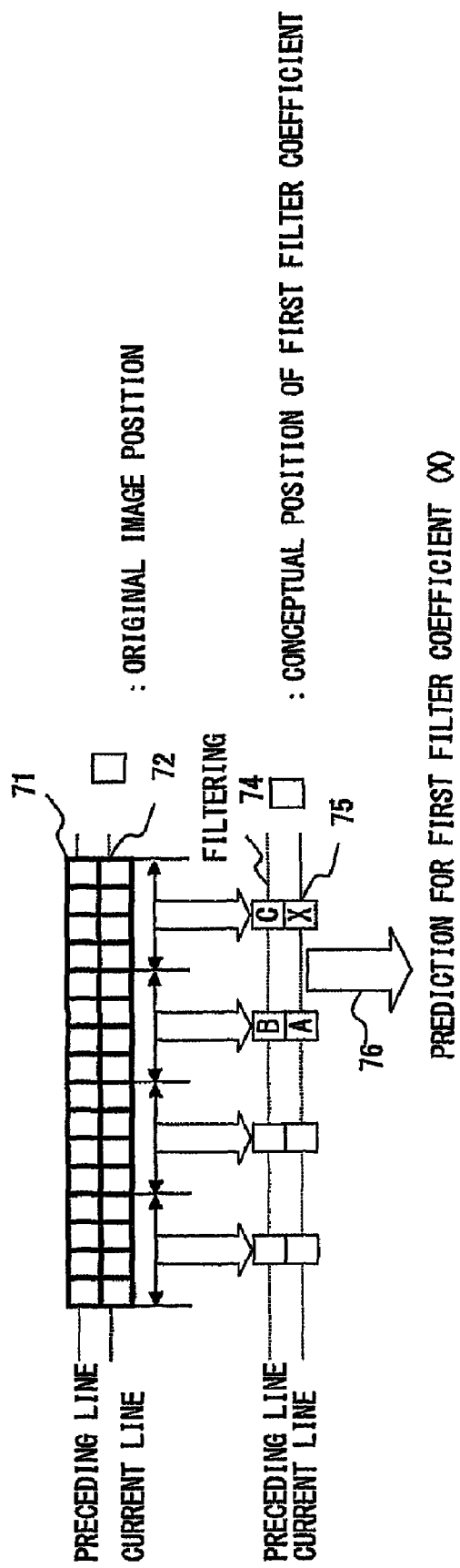
FIG. 7 is a diagram for explaining a prediction method of a first filter coefficient (X) according to the first embodiment.

Described next is a prediction method of the first filter coefficient. FIG. 7 is a diagram for explaining a prediction method of the first filter coefficient (X). In the FIG. 7, X indicates the position of a prediction target coefficient.

In FIG. 7, filtering is performed for every horizontally-aligned four pixels 71 belonging to the preceding line and for every horizontally-aligned four pixels 72 belonging to the current line. Then, a filter coefficient 74 belonging to the preceding line and a filter coefficient 75 belonging to the current line are calculated respectively on the basis of the equation (1) mentioned above. These coefficients 74 and 75 are stored in a line memory.

Then, when predicting the prediction target coefficient X, the prediction is performed as illustrated in FIG. 8. That is, in the prediction, the values for the first filter coefficient obtained from the vicinity of the prediction target coefficient X are utilized; for example, the values C, B, and A are utilized, each of which is the value of the first filter coefficient, and which have been obtained from the immediately above, upper-left, and left positions respectively relative to the position of the prediction target coefficient X. Utilizing the above-mentioned values, coefficients B' and C' close to the prediction target coefficient X are calculated by interpolation processes between the coefficients. Then, predicted value X' is output on the basis of the interpolated values and the value C corresponding to the position immediately above.

Since the prediction target coefficient X is close to the immediately-above coefficient C in terms of distance and has high correlation with the immediately-above coefficient C, prediction placing emphasis on the coefficient C is performed in the prediction of the first filter coefficient. Also, the interpolated values B' and C' are calculated in order to avoid the deterioration of the prediction accuracy that might be caused if MAP (Median Adaptive Predictor) or MED (Median Edge Detection predictor) is simply used as-is when predicting the coefficient. If MAP or MED is used as-is, the deterioration might be caused because the distance to the position of the prediction target coefficient X from the pixels in the left (A) and upper left (B) direction is so far that the prediction accuracy might deteriorate.

Meanwhile, while the mean value for each unit of horizontally-aligned four pixels is adopted as an example of the filter coefficient, the above-mentioned prediction method is obviously efficient for other filter coefficients that represent other low-frequency components. The reason is that the problem in the prediction of a low-frequency component in the one-dimensional subband coding is that the distance between coefficients is far, or uneven.

Described next is a prediction method of the second and third filter coefficients. For the second and third filter coefficients, prediction is performed while adaptively selecting whether to quantize the difference between the coefficient value of the preceding line and the coefficient value of the current line, where the former has been calculated and is held in the line memory, or to quantize the coefficient value of the current line directly without obtaining the difference. Note that the coefficient values of the second and third filter coefficients held in the line memory have been calculated with the above-mentioned equations 2 and 3, respectively.

When the difference is obtained only when the slants (i.e., high-frequency components) appear successively in the vertical direction, the image quality and compression efficiency increase as the prediction error becomes small, but in other cases, obtaining the difference may cause significant misprediction, so the selection whether to obtain the difference or not to obtain the difference is made adaptively to perform the prediction.

A method for the adaptive selection is as follows. In the case where the prediction error was small when the difference was obtained at the time of the prediction of the coefficient value of the preceding line, it is determined that there are successive slants and the difference is obtained also at the time of the prediction of the coefficient value of the current line. On the contrary, in the case where the prediction error was smaller when quantization was performed directly without obtaining the difference at the time of the prediction of the coefficient value of the preceding line, it is determined that there is no successive slant in the vertical direction, and quantization is performed directly without obtaining the difference also at the time of the prediction of the coefficient value of the current line.

The specific implementation may be as follows. The coefficient value of the preceding line is held in the line memory in the case where it was better to obtain the difference at the time of the prediction of the coefficient value of the preceding line; and on the contrary, in the case where it was better not to obtain the difference, 0 (zero) is held in the line memory. This makes it possible to select adaptively whether to obtain or not to obtain the difference by obtaining the difference between the coefficient value of the current line and the value held in the line memory at every time the prediction of the coefficient value of the current line is performed.

Described next is a prediction method of the forth filter coefficient. The fourth filter coefficient is calculated on the basis of the equation (4) mentioned above. When performing prediction for the fourth filter coefficient, in view of the second row in the SLT matrix illustrated in FIG. 5, the predicted value of the fourth filter coefficient is calculated with reference to the value of the second filter coefficient calculated with the equation (2) and held in the line memory.

That is, it can be predicted that the differential value, which corresponds to the fourth filter coefficient, of the two pixels in the middle of the horizontally-aligned four pixels illustrated in FIG. 4 has a high possibility of being ⅓ (one third) of the differential value, which corresponds to the second filter coefficient, of the two pixels at the ends of the same horizontally-aligned four pixels (when the prediction goes wrong, the value obtained by transform according to the fourth row of the SLT matrix is used).

For this reason, the differential value, which corresponds to the second filter coefficient, of the two pixels at the ends of the horizontally-aligned four pixels is calculated first; the calculated differential value (i.e., prediction error) of the two pixels at the ends is quantized; and next, the value being ⅓ (one third) of the quantized differential value (i.e., quantized value of the prediction error) of the two pixels at the ends is taken as the predicted value for the differential value, which corresponds to the fourth filter coefficient, of the two pixels in the middle of the horizontally-aligned four pixels.

As described above, in the prediction performed in the predictor 43 of the first embodiment, the predicted values are calculated with the prediction methods being changed for each filter coefficient (wherein each filter corresponds to each band), while performing the prediction based on the slant transform (SLT). By doing so, the prediction accuracy is increased, and the image quality and the compression rate are improved even for the compression of image data adopting the one-dimensional subband coding.

Here, holding values in the line memory as mentioned above is explained. The coefficient values of the second, third, and fourth filter coefficients, each of which is held in the line memory after the quantization of the prediction error in the current line, may require the number of levels that is twice the number of gradations of the original pixel because these coefficient values are differential signals.

For this reason, if the number of gradations of the original pixel is maintained and the differential signal is held with the same level of granularity, the storage amount in the memory will increase and the capacity may fall short if a line memory is used. Accordingly, the first embodiment is arranged to hold the differential signals while reducing their number of levels.

As for the frequency of occurrence of the differential signals, those having a small absolute value tend to occur frequently because transition between pixels is smooth in most cases in a natural image. Therefore, when the number of gradations of the original pixel is 256 (corresponding to 8 bits), the number of levels of the differential signal becomes 512 (corresponding to 9 bits) without change, so the number of levels of the differential signal is reduced as described below. By this, the differential signal is also expressed with 256 gradations (corresponding to 8 bits).

When the absolute value of the differential signal is equal to or smaller than 64, no reduction in the number of levels is performed. When the absolute value of the differential signal is larger than 64 and equal to or smaller than 128, the number of levels corresponding to this range is reduced to ½ of the original number of levels. When the absolute value of the differential signal is larger than 128, the number of levels corresponding to this range is reduced to ¼ of the original number of levels.

Thus, the first embodiment is capable of increasing the prediction accuracy of each filter coefficient when performing the one-dimensional subband coding with a memory of which amount corresponding to one line memory. In addition, while the filter coefficient prediction based on the SLT is performed, the number of pixels used for the calculation of the high-frequency component is smaller compared to the original SLT. Accordingly, the occurrence of mosquito noises can be suppressed.

Meanwhile, while the coefficient values of second, third, and fourth filter coefficients are adopted as examples here, the reduction method is obviously effective for other filter coefficients (especially ones representing the high-frequency component). This is because other differential signals also indicate a tendency that those having a small absolute value tend to occur frequently.

First Embodiment

Figure 9:
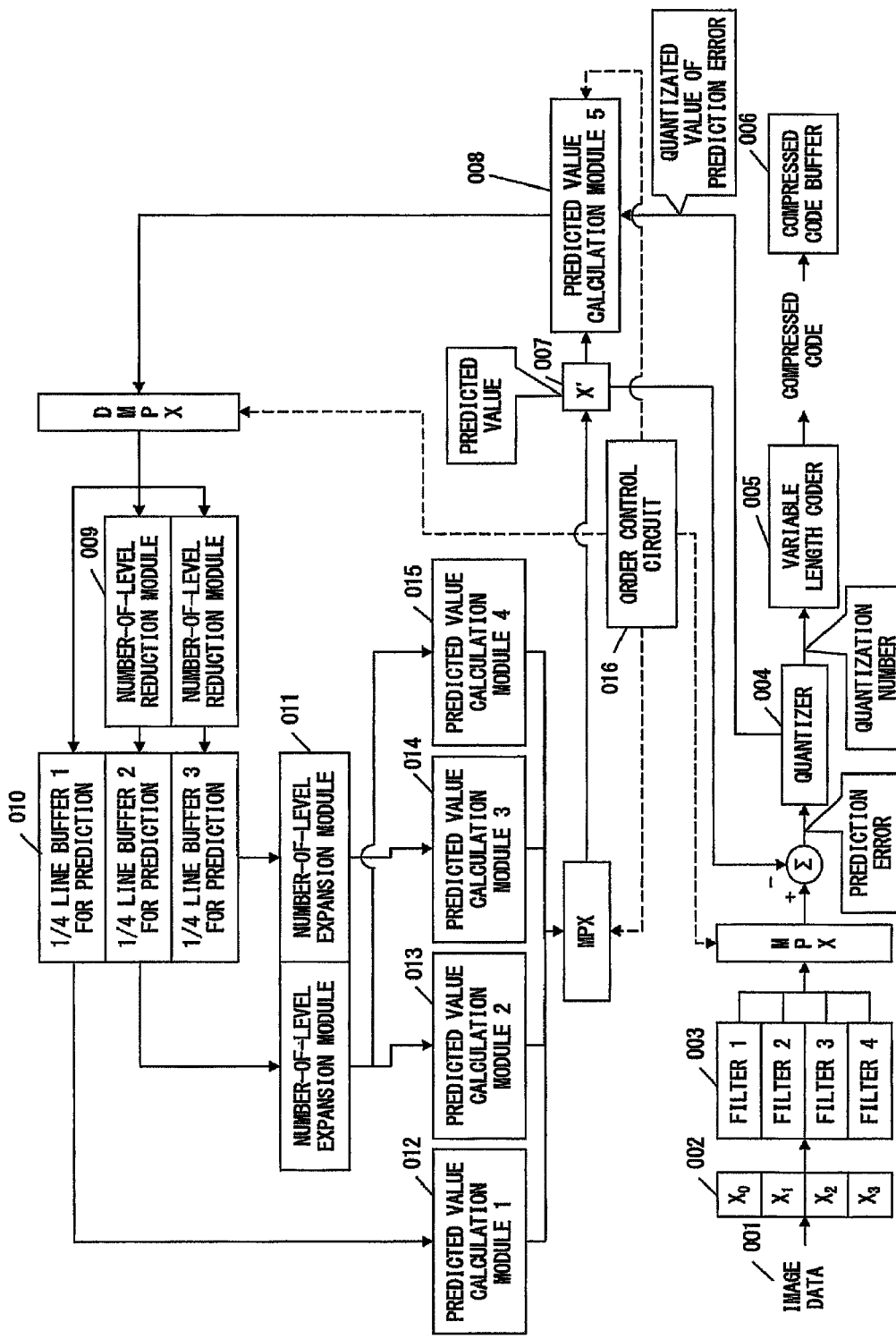
FIG. 9 is a block diagram illustrating the configuration of an image data compression apparatus (i.e., image data coding apparatus) according to the first embodiment.

An example of an image data compression apparatus according to the first embodiment is described below. FIG. 9 is a block diagram illustrating the configuration of an image data compression apparatus (i.e., image data coding apparatus) according to the first embodiment.

Image data (001) represents a group of pixels. Each pixel is the compression target expressed in 256 gradations with the 8-bit pixel value. A compression target pixel group (002) is sent to filters (003) in units of four pixels ($X_0, X_1, X_2, X_3$). The filters (003) include first to fourth filters which are illustrated in FIG. 9 as "filter1" to "filter4", respectively. The filters (003) calculate the first to fourth filter coefficients described above for the pixels sent from the compression target pixel group (002)

A quantizer (004) quantizes the "prediction error" that is the differential value between either of the first to fourth filter coefficients and a predicted value X' (007) Specifically, as illustrated in the table in FIG. 10, the quantizer (004) receives the prediction error as an input and outputs a quantized value and a quantization number.

A variable length coder (005) receives the quantization number output from the quantizer (004) as an input and outputs a variable length code. A compressed code buffer (006) temporarily stores the variable length code output from the variable length coder (005). Meanwhile, with the variable length coding mentioned above, the "prediction error" (i.e., difference) may be directly coded without quantization.

The predicted value X' (007) is calculated for each filter coefficient by a predictor that includes first to fourth predicted value calculation modules (012-015). A fifth predicted value calculation module (008) calculates a predicted value to be used for the next line from a quantized value of the prediction error (see the table illustrated in FIG. 10) output from the quantizer (004) and the predicted value X' (007). The first to fifth predicted value calculation modules (012-015 and 008) are illustrated in FIG. 9 as "predicted value calculation module 1" to "predicted value calculation module 5", respectively.

Each number-of-level reduction module (009) reduces the number of levels of the predicted value for either the second or third filter coefficient so that the predicted value is expressed in 256 gradations. First to third ¼ line buffers (010) for prediction respectively hold the predicted values of the first to third filter coefficients. The first to third ¼ line buffers (010) for prediction are illustrated in FIG. 9 as "¼ line buffer 1 for prediction" to "¼ line buffer 3 for prediction", respectively.

Each number-of-level expansion module (011) expands the predicted value of either the second or third filter coefficient of which number of levels has been reduced, to recover 512 gradations.

The first predicted value calculation module (012) calculates the predicted value for the first filter coefficient. The second predicted value calculation module (013) calculates the predicted value for the second filter coefficient. The third predicted value calculation module (014) calculates the predicted value for the third filter coefficient. The fourth predicted value calculation module (015) calculates the predicted value for the fourth filter coefficient.

An order control circuit (016) controls some components such as a multiplexer and a demultiplexer (illustrated in FIG. 9 as "MPX" and "DMPX", respectively) so as to process the first through fourth filter coefficients sequentially.

Figure 12:
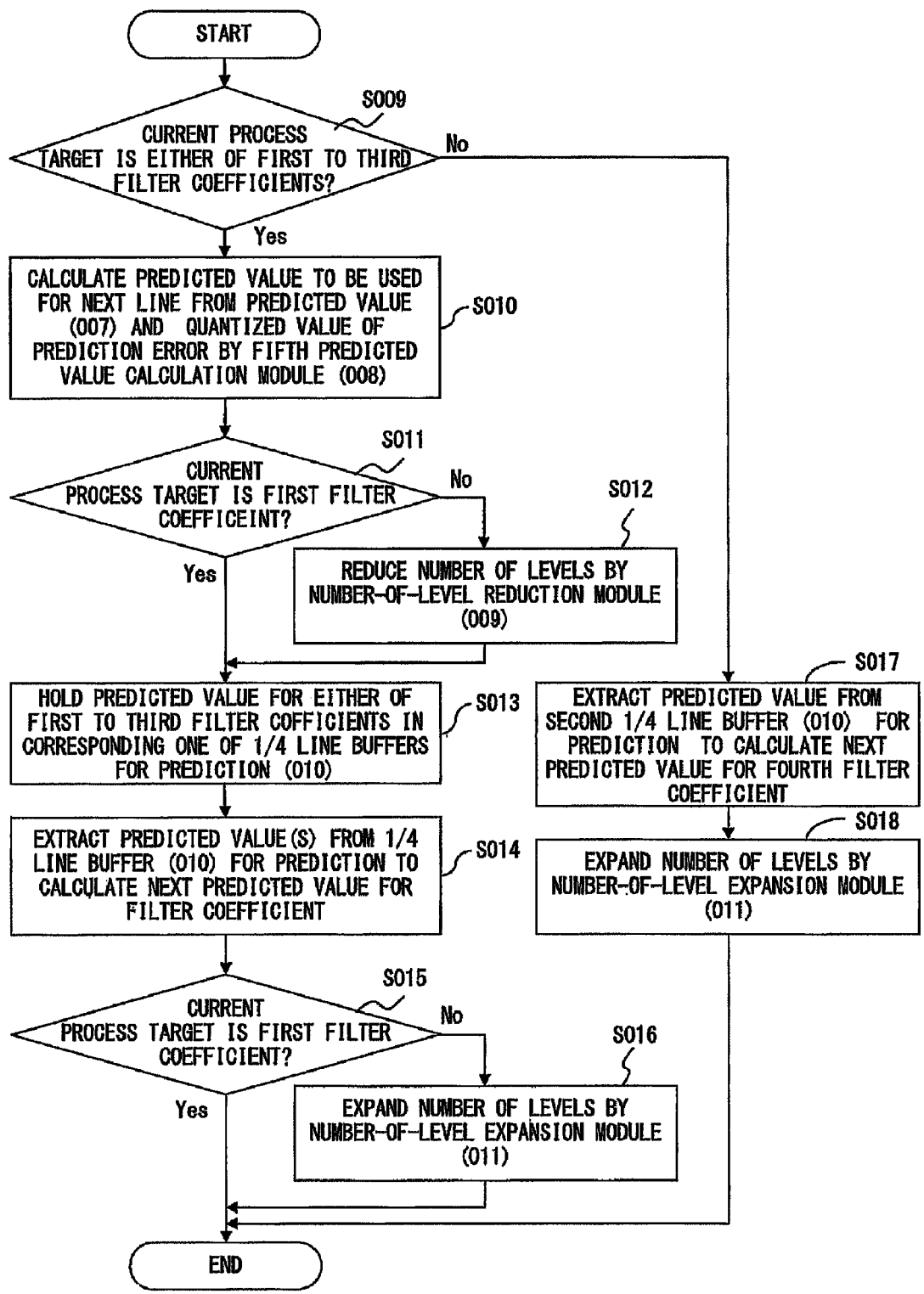
FIG. 12 is a flowchart illustrating the contents of a subroutine process in step S006 described in FIG. 11.

The operation of the image data compression apparatus (i.e., image data coding apparatus) illustrated in FIG. 9 according to the first embodiment is explained using FIGS. 11-13.

FIG. 11 is a flowchart describing the overall operation of the image data compression apparatus (i.e., image data coding apparatus) according to the first embodiment. In the flowchart illustrated in FIG. 11, the operation of each step is as follows.

In a step S001, the compression target pixel group (002) is obtained in units of four pixels from the image data (001). In a step S002, the compression target pixel group (002) is input to the filters (003), and the first to fourth filter coefficients described above are calculated.

In a step S003, the predicted value X' (007) is subtracted from an i-th (¼) calculated filter coefficient, to calculate the prediction error. An initial value of i is 1 (one). In a step S004, the prediction error is quantized by the quantizer (004), to obtain the quantized value and quantization number. In a step S005, a code (i.e., variable length code) is generated on the basis of the quantization number.

In a step S006, a predicted value to be used for the next line is calculated by a subroutine (which is a process by a local decoder and the predicted value calculation module as illustrated in FIG. 12), and the predicted value for either of the first to fourth filter coefficients (i.e., for the i-th filter coefficient) is calculated in a corresponding one of the first to fourth predicted value calculation modules (i.e., in the i-th predicted value calculation module).

The operation in a step S007 is as follows. When processes for the first to fourth filter coefficients are completed, the control proceeds to the process of a step S008; otherwise, the control returns to the process of the step S003 with incrementing i.

The operation in the step S008 is as follows. When processes for all image data are completed, the whole compression process is terminated; otherwise, the control returns to the process of the step S001.

FIG. 12 is a flowchart illustrating the contents of the subroutine process in the step S006 described in FIG. 11.

The operation in a step S009 is as follows. When the current process target is either of the first to third filter coefficients (i.e., when i is 1, 2, or 3), the control proceeds to the process of a step S010; otherwise, the control proceeds to the process of a step S017.

In the step S010, a predicted value to be used for the next line (i.e., one for a posterior use) is calculated by the fifth predicted value calculation module (008) from the predicted value X' (007) and the quantized value of the prediction error. In the fifth predicted value calculation module (008), the process is branched depending on whether the current process target is the first filter coefficient, or the second or third filter coefficient (i.e., whether i=1 or 2≦i≦3). This process is illustrated in FIG. 13.

FIG. 13 is a flowchart describing the process in the fifth predicted value calculation module (008). In FIG. 13, the operation of each step is as follows.

The operation in a step S010-1 is as follows. When the current process target is the first filter coefficient, the control proceeds to the process of a step S010-3; otherwise, the control proceeds to the process of a step S010-2.

In the step S010-2, the quantized value of the prediction error is added to the predicted value X' (007) and it is judged whether or not the result of the addition is closer to 0 (zero) than to the predicted value X' (007). When it is closer to 0 (zero), the control proceeds to the process of a step S010-4; otherwise, the control proceeds to the process of the step S010-3.

In the step S010-3, the result of the addition of the quantized value of the prediction error to the predicted value X' (007) is adopted as the predicted value. In the step S010-4, 0 (zero) is adopted as the predicted value.

Returning to FIG. 12, the operation in a step S011 is as follows. When the current process target is the first filter coefficient, the control proceeds to the process of a step S013; otherwise, the control proceeds to the process of a step S012.

In the step S012, the number of gradations of the differential signal (i.e., predicted value) is reduced from 512 to 256 as in the following (1)-(3) by the number-of-level reduction module (009).

(1) When the absolute value of the differential signal is equal to or smaller than 64, no reduction in the number of levels is performed.

(2) When the absolute value of the differential signal is larger than 64 and equal to or smaller than 128, the number of levels corresponding to this range is reduced to ½ (one second) of the original number of levels.

(3) When the absolute value of the differential signal is larger than 128, the number of levels corresponding to this range is reduced to ¼ (one fourth) of the original number of levels.

In the step S013, the predicted value for either of the first to third filter coefficients (i.e., for the i-th filter coefficient) is held in a corresponding one (i.e., i-th one) of the first to third ¼ line buffers (010) for prediction.

In a step S014, the predicted value(s) for either of the first to third filter coefficients (i.e., for the i-th filter coefficient) is/are extracted from the corresponding one (i.e., the i-th one) of the first to third ¼ line buffers (010) for prediction. Then, the next predicted value for the i-th filter coefficient is calculated. How the next predicted value is calculated is described below.

With respect to the first filter coefficient, it is described under the assumption as illustrated in FIG. 8. That is, the coefficient of the position immediately above the position of the filter coefficient X being the prediction target is assumed as C; the filter coefficient that was the prediction target last time is assumed as A; and the coefficient of the upper-left position relative to the position of the filter coefficient X being the prediction target is assumed as B.

An interpolated value A' between the coefficient C of the position immediately above the position of the filter coefficient X being the prediction target and the filter coefficient A that was the prediction target last time is calculated as follows.

$$A' = (A+C+1)/2$$

An interpolated value B' between the coefficient C of the position immediately above the position of the filter coefficient X being the prediction target and the coefficient B of the upper-left position relative to the position of the filter coefficient X being the prediction target is calculated as follows.

$$B' = (B+C+1)/2$$

The predicted value X' is calculated as follows on the basis of these interpolated values A' and B' and the coefficient C of the immediately-above position.

$$X' = \text{an intermediate value among } A', C, \text{ and } A'+C-B',$$

where it is supposed that $A'+C-B' = (A+2C-B+1)/2$.

The equation for calculating the predicted value X' of the first filter coefficient (i.e., low-frequency component) is generalized as below. Assume that the coefficients of the left, upper, and upper-left positions relative to the position of the prediction target coefficient are A, C, and B, respectively.

Also assume that coefficients m and n have respective certain values other than 0 (zero). The predicted value X' may be calculated as the intermediate value among three candidates $$C,$$

$$(m \cdot A + n \cdot C)/(m+n), \text{ and}$$

$$C + (m \cdot A + n \cdot C)/(m+n) - (m \cdot C + n \cdot B)/(m+n)$$

for the predicted value.

With respect to the second filter coefficient, in the filter coefficients held in the second ¼ line buffer (010) for prediction, the coefficient corresponding to the immediately-above position is adopted as the predicted value.

With respect to the third filter coefficient, in the filter coefficients held in the third ¼ line buffer (010) for prediction, the coefficient corresponding to the immediately-above position is adopted as the predicted value.

The operation in a step S015 is as follows. When the current process target is the first filter coefficient, the process is terminated; otherwise, the control proceeds to the process of step a S016. In the step S016, in the number-of-level expansion module (011), the reduced number of gradations of the differential signal is expanded from 256 to 512.

In the step S017, the predicted value is extracted from the second ¼ line buffer (010) for prediction, and the next predicted value for the fourth filter coefficient is calculated. That is, with respect to the fourth filter coefficient, the value being ⅓ (one third) of the filter coefficient of the immediately-above position among the filter coefficients held in the second ¼ line buffer (010) for prediction is adopted as the predicted value.

In a step S018, in the number-of-level expansion module (011), the reduced number of gradations of the differential signal is expanded from 256 to 512.

Thus, in the predictor in the image data compression apparatus of the first embodiment, the use of the first predicted value calculation module (012) makes it possible to predict the first filter coefficient with high accuracy. The reason is that the first filter coefficient representing the mean value of the horizontally-aligned four pixels in the original image is predicted on the basis of the interpolated values, which are calculated, by the interpolation process, for the coefficients of the positions closer to the position of the prediction target coefficient than are the positions of the coefficients between which the interpolation process is performed.

Meanwhile, while the mean value of horizontally-aligned four pixels, which form one group, is adopted as an example of the filter coefficient, the above-mentioned prediction method is obviously efficient for other filter coefficients that represent other low-frequency components. The reason is that the problem in the prediction of a low-frequency component in the one-dimensional subband coding is that the distance between coefficients is far, or uneven.

For example, the low-frequency component of the one-dimensional DCT is the mean of eight pixels. Since the correlation with the coefficient of the immediately-above position is high, the weight of the coefficient C of the immediately-above position may be increased so that $$C,$$

$$(1 \cdot A + 3 \cdot C)/(1+3), \text{ and}$$

$$C + (1 \cdot A + 3 \cdot C)/(1+3) - (1 \cdot C + 3 \cdot B)/(1+3)$$

are used as three candidates for the predicted value.

In addition, by using the second and third predicted value calculation modules (013 and 014), whether to quantize the difference between the filter coefficient value of the preceding line and that of the current line or to perform quantization directly without obtaining the difference is adaptively selected for the second and third filter coefficients, making it possible to increase the accuracy in predicting the second and third filter coefficients.

When the difference between the filter coefficient value of the preceding line and that of the current line is obtained only when the slants appear successively in the vertical direction, the image quality and compression efficiency increase as the prediction error becomes small, but in other cases, obtaining the difference may cause significant misprediction.

In this regard, the prediction accuracy can be increased by the following procedures. In the case where the prediction error was small when the difference was obtained at the time of the prediction of the coefficient value of the preceding line, it is determined that there are successive slants and the difference is obtained also at the time of the prediction of the coefficient value of the current line. On the contrary, in the case where the prediction error was smaller when quantization was performed directly without obtaining the difference at the time of the prediction of the coefficient value of the preceding line, it is determined that there is no successive slant in the vertical direction, and quantization is performed directly without obtaining the difference also at the time of the prediction of the coefficient value of the current line.

Meanwhile, while the filter coefficient representing the slant (i.e., high-frequency component) is adopted as an example of the filter coefficient here, the above-mentioned prediction method is obviously effective for a filter coefficient using a simple difference as the one used in Haar wavelet transform. The reason is that the problem in the prediction of the high-frequency component in the one-dimensional subband coding is that there is a prominent difference in whether or not the coefficient value appears successively.

In addition, by using the fourth predicted value calculation module (015), it becomes possible to calculate the predicted value for the fourth filter coefficient easily as well as to increase the prediction accuracy. Based on the SLT and taking the second row of the SLT matrix into consideration, the differential value of the two pixels in the middle of the horizontally-aligned four pixels is likely to be ⅓ (one third) of the differential value of the two pixels at the ends of the horizontally-aligned four pixels (i.e., the fourth filter coefficient is likely to be one third of the second filter coefficient) (when the prediction goes wrong, the value obtained by transform according to the fourth row in the SLT matrix is used).

For this reason, it becomes possible to calculate the predicted value for the fourth filter coefficient easily as well as to increase the prediction accuracy, by calculating the differential value, which corresponds to the second filter coefficient, of the two pixels at the ends of the horizontally-aligned four pixels first; quantizing the calculated differential value (i.e., prediction error) of the two pixels at the ends; and next, adopting the value being ⅓ (one third) of the quantized differential value (i.e., quantized value of the prediction error) of the two pixels at the ends as the predicted value for the differential value, which corresponds to the fourth filter coefficient, of the two pixels in the middle of the horizontally-aligned four pixels.

In addition, by using the number-of-level reduction modules (009), it becomes possible to hold the second, third, and fourth filter coefficients in the respective line memories.

As for the frequency of occurrence of the differential signals, those having a small absolute value tend to occur frequently because transition between pixels is smooth in most cases in a natural image. Therefore, it is possible to reduce the number of levels of the differential signal so that the differential signal may also be expressed with 256 gradations.

Meanwhile, while the coefficient values of the second, third, and fourth filter coefficients are adopted as examples here, the reduction method is obviously effective for other filter coefficients (especially ones representing the high-frequency component). This is because other differential signals also indicate a tendency that those having a small absolute value tend to occur frequently.

Second Embodiment

Figure 14:
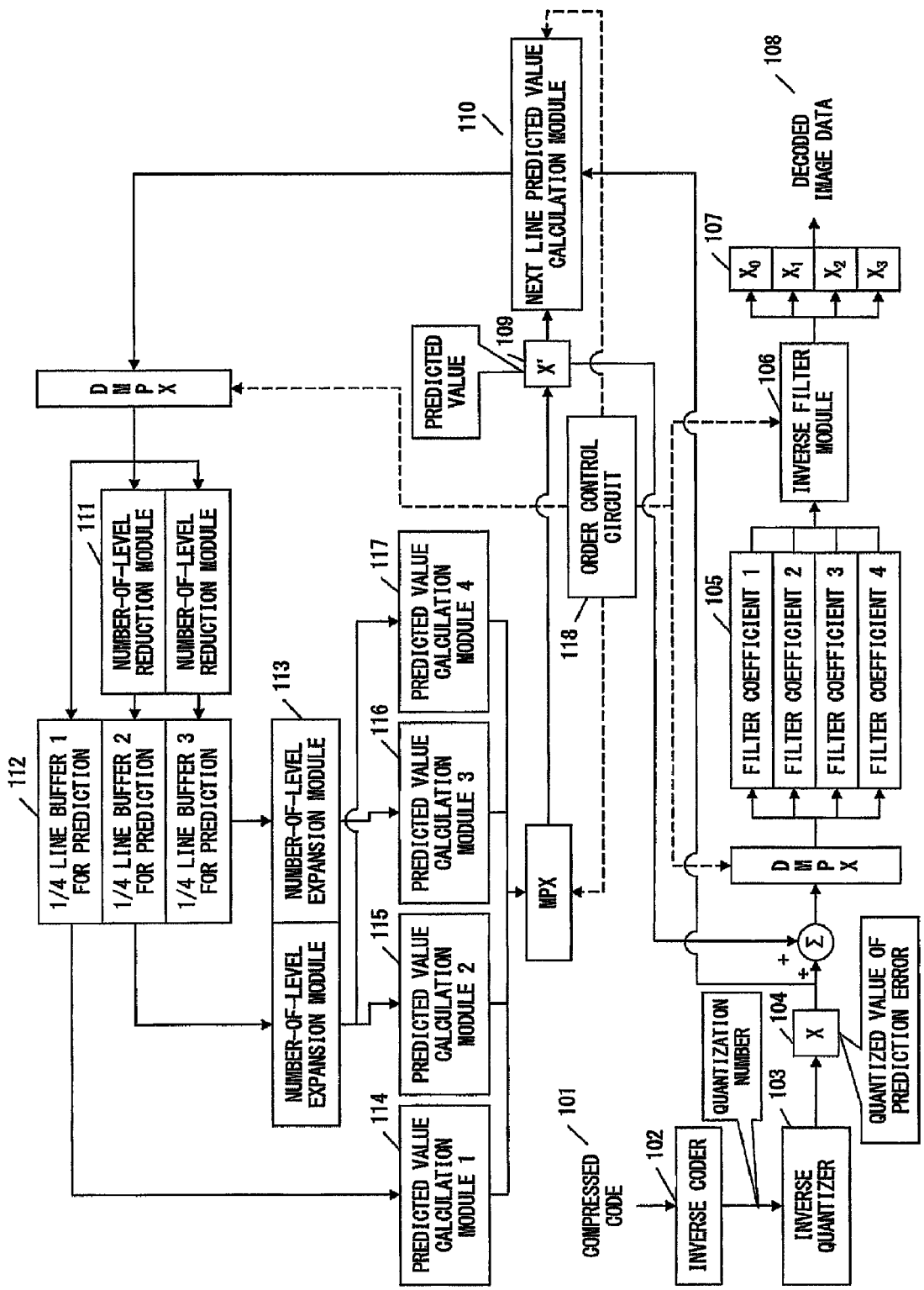
FIG. 14 is a block diagram illustrating the configuration of an image data decoding apparatus according to a second embodiment.

An example of an image data decoding apparatus according to the second embodiment is described below. FIG. 14 is a block diagram illustrating the configuration of an image data decoding apparatus according to the second embodiment.

In FIG. 14, a compressed code (101) represents image data resulted from compression coding by the image data compression apparatus (i.e., image data coding apparatus) illustrated in FIG. 9. An inverse coder (102) receives the compressed code (101) as input, and outputs a quantization number corresponding to the compressed code (101).

An inverse quantizer (103) receives the quantization number that is the output from the inverse coder (102), and outputs the quantized value of a prediction error, as illustrated in the table in FIG. 15. A value X (104) output from the inverse quantizer (103) represents the quantized value of the prediction error.

First to fourth filter coefficients (105) respectively represents decoded filter coefficients, and are illustrated in FIG. 14 as "filter coefficient 1" to "filter coefficient 4", respectively. An inverse filter module (106) calculates a pixel value from each filter coefficient. A decoding target pixel group (107) represents decoded pixels in which four pixels ($X_0$, $X_1$, $X_2$, $X_3$) decoded from the inverse filter module (106) belong to one group. Decoded image data (108) represents the image data as the result of the decoding.

The predicted value X' (109) is calculated by a predictor that includes first to fourth predicted value calculation modules (114-117), which are illustrated in FIG. 14 as "predicted value calculation module 1" to "predicted value calculation module 4", respectively.

A fifth predicted value calculation module (110), illustrated in FIG. 14 as a "next line predicted value calculation module", calculates a predicted value to be used for the next line from the quantized value (104) of the prediction error (see the table illustrated in FIG. 15) output from the inverse quantizer (103) and the predicted value X' (109)

Each number-of-level reduction module (111) reduces the number of levels of the predicted value for either the second or third filter coefficient so that the predicted value is expressed in 256 gradations. First to third ¼ line buffers (112) for prediction respectively hold the predicted values of the first to third filter coefficients. The first to third ¼ line buffers (112) for prediction are illustrated in FIG. 14 as "¼ line buffer 1 for prediction" to "¼ line buffer 3 for prediction", respectively.

Each number-of-level expansion module (113) expands the predicted value of either the second or third filter coefficient of which number of levels has been reduced, to recover 512 gradations.

The first predicted value calculation module (114) calculates the predicted value for the first filter coefficient. The second predicted value calculation module (115) calculates the predicted value for the second filter coefficient. The third predicted value calculation module (116) calculates the predicted value for the third filter coefficient. The fourth predicted value calculation module (117) calculates the predicted value for the fourth filter coefficient.

An order control circuit (118) controls some components such as a multiplexer and demultiplexers (illustrated in FIG. 14 as "MPX" and "DMPX", respectively) so as to process the first to fourth filter coefficients sequentially.

Figure 18:
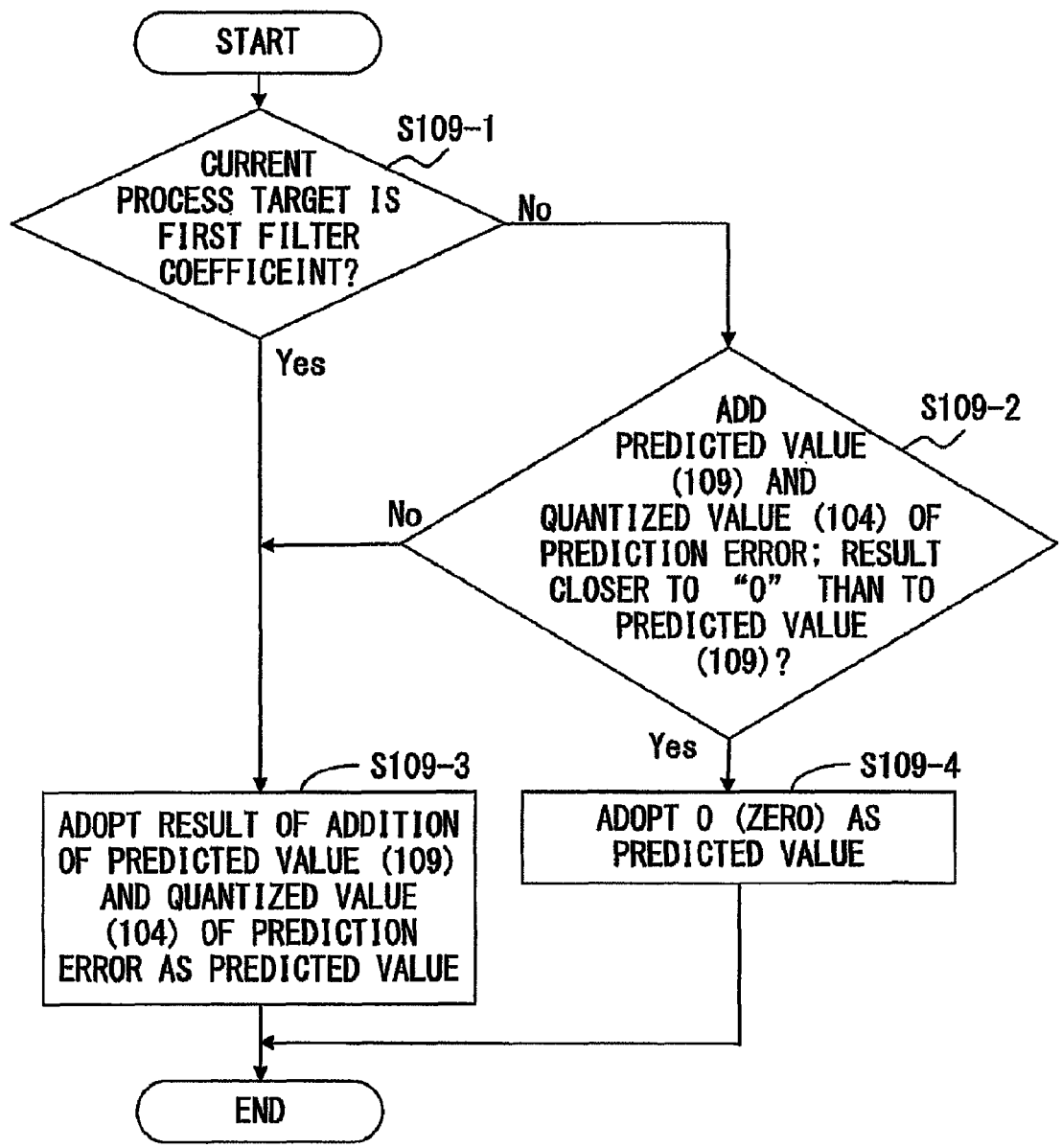
FIG. 18 is a flowchart illustrating detailed process contents in step S109 described in FIG. 17.

The operation of the image data decoding apparatus illustrated in FIG. 14 according to the second embodiment is explained using FIGS. 16-18.

FIG. 16 is a flowchart describing the overall operation of the image data decoding apparatus according to the second embodiment. In the flowchart illustrated in FIG. 16, the operation of each step is as follows.

In a step S101, the compressed code (101) is input to the inverse coder (102), and the quantization number is output. In a step S102, the quantization number is input to the inverse quantizer (103), and the quantized value (104) of the prediction error is output.

In a step S103, the quantized value (104) of the prediction error obtained in the process of the step S102 and the predicted value X' (109) are added, to calculate the filter coefficient (105).

In a step S104, a predicted value to be used for the next line is calculated by a subroutine (which is a process by a local decoder and the predicted value calculation module as illustrated in FIG. 17), and the predicted value for either the first to fourth filter coefficient (i.e., for an i-th filter coefficient, where $1 \leq i \leq 4$ and an initial value of i is 1) is calculated in a corresponding one of the first to fourth predicted value calculation modules (i.e., in the i-th one of the predicted value calculation modules (114-117)).

The operation in a step S105 is as follows. When processes for the first to fourth filter coefficients are completed, the control proceeds to the process of a step S106; otherwise, the control returns to the process of the step S101 with incrementing i.

In the step S106, the pixel value of each pixel in the decoding target pixel group (107) is calculated in the inverse filter module (106).

The operation in a step S107 is as follows. When processes for all image data are completed, the process is terminated; otherwise, the control returns to the process of the step S101.

FIG. 17 is a flowchart illustrating the contents of the subroutine process in the step S104 described in FIG. 16.

The operation in a step S108 is as follows. When the current process target is either of the first to third filter coefficients (i.e., when i is 1, 2, or 3), the control proceeds to the process of a step S109; otherwise, the control proceeds to the process of a step S116.

In the step S109, a predicted value to be used for the next line is calculated by the fifth predicted value calculation module (110) from the predicted value X' (109) and the quantized value (104) of the prediction error. In the fifth predicted value calculation module (110), the process is branched depending on whether the current process target is the first filter coefficient, or the second or third filter coefficient (i.e., whether i=1 or 2-3). This process is illustrated in FIG. 18.

FIG. 18 is a flowchart describing the process in the fifth predicted value calculation module (110). In FIG. 18, the operation of each step is as follows.

The operation in a step S109-1 is as follows. When the current process target is the first filter coefficient, the control proceeds to the process of a step S109-3; otherwise, the control proceeds to the process of a step S109-2.

In the step S109-2, the predicted value X' (109) and the quantized value (104) of the prediction error are added, and it is judged whether or not the result of the addition is closer to 0 (zero) than to the predicted value X' (109). When it is closer to 0 (zero), the control proceeds to the process of a step S109-4; otherwise, the control proceeds to the process of the step S109-3.

In the step S109-3, the result of the addition of the predicted value X' (109) and the quantized value (104) of the prediction error is adopted as the predicted value. In the step S109-4, 0 (zero) is adopted as the predicted value.

Returning to FIG. 17, the operation in a step S110 is as follows. When the current process target is the first filter coefficient, the control proceeds to the process of a step S112; otherwise, the control proceeds to the process of a step S111.

In the step S111, the number of gradations of the addition signal (i.e., predicted value) is reduced from 512 to 256 as in the following (1)-(3) by the number-of-level reduction module (111)

(1) When the absolute value of the addition signal is equal to or smaller than 64, no reduction in the number of levels is performed.

(2) When the absolute value of the addition signal is larger than 64 and equal to or smaller than 128, the number of levels corresponding to this range is reduced to ½ (one second) of the original number of levels.

(3) When the absolute value of the addition signal is larger than 128, the number of levels corresponding to this range is reduced to ¼ (one fourth) of the original number of levels.

In the step S112, the predicted value for either of the first to third filter coefficients (i.e., for the i-th filter coefficient) is held in a corresponding one (i.e., i-th one) of the first to third ¼ line buffers (112) for prediction.

In a step S113, the predicted value (s) is/are extracted from either of the first to third ¼ line buffers (112) for prediction (i.e., extracted from the i-th ¼ line buffers (112) for prediction). Then, the next predicted value for the i-th filter coefficient is calculated. How the next predicted value is calculated is described below.

With respect to the first filter coefficient, it is described under the assumption as illustrated in FIG. 8. That is, the coefficient of the position immediately above the position of the filter coefficient X being the prediction target is assumed as C; the filter coefficient that was the prediction target last time is assumed as A; and the coefficient of the upper-left position relative to the position of the filter coefficient X being the prediction target is assumed as B.

An interpolated value A' between the coefficient C of the position immediately above the position of the filter coefficient X being the prediction target and the filter coefficient A that was the prediction target last time is calculated as follows.

$$A'=(A+C+1)/2$$

An interpolated value B' between the coefficient C of the position immediately above the position of the filter coefficient X being the prediction value and the coefficient B of the upper-left position relative to the position of the filter coefficient X being the prediction target is calculated as follows.

$$B'=(B+C+1)/2,$$

The predicted value X' is calculated as follows on the basis of these interpolated values A' and B' and the coefficient C of the immediately-above position.

$$X'=\text{an intermediate value among } A', C, \text{ and } A'+C-B',$$

where it is supposed that $A'+C-B'=(A+2C-B+1)/2$.

The equation for calculating the predicted value X' of the first filter coefficient (i.e., low-frequency component) is generalized as below. Assume that the coefficients of the left, upper, and upper-left positions relative to the position of the prediction target coefficient are A, C, and B, respectively. Also assume that coefficients m and n have respective certain values other than 0 (zero). The predicted value X' may be calculated as the intermediate value among three candidates $$C,$$

$$(m \cdot A + n \cdot C)/(m+n), \text{ and}$$

$$C+(m \cdot A+n \cdot C)/(m+n)-(m \cdot C+n \cdot B)/(m+n)$$

for the prediction value.

With respect to the second filter coefficient, in the filter coefficients held in the second ¼ line buffer (112) for prediction, the coefficient corresponding to the immediately-above position is adopted as the predicted value.

With respect to the third filter coefficient, in the filter coefficients held in the third ¼ line buffer (112) for prediction, the coefficient corresponding to the immediately-above position is adopted as the predicted value.

The operation in a step S114 is as follows. When the current process target is the first filter coefficient, the process is terminated; otherwise, the control proceeds to the process of a step S115. In the step S115, for the second or third filter coefficient, in the number-of-level expansion module (113), the reduced number of gradations of the addition signal is expanded from 256 to 512.

In the step S116, the predicted value is extracted from the second ¼ line buffer (112) for prediction, and the next predicted value for the fourth filter coefficient is calculated. That is, with respect to the fourth filter coefficient, the value being ⅓ (one third) of the filter coefficient of the immediately-above position among the filter coefficients held in the second ¼ line buffer (112) for prediction is adopted as the predicted value.

In a step S117, in the number-of-level expansion module (113), the reduced number of gradations of the addition signal is expanded from 256 to 512.

Thus, in the predictor in the image data decoding apparatus of the second embodiment, the use of the first predicted value calculation module (114) makes it possible to predict the first filter coefficient with high accuracy. The reason is that the first filter coefficient representing the mean value of the horizontally-aligned four pixels in the original image is predicted on the basis of the interpolated values, which are calculated, by the interpolation process, for the coefficients of the positions closer to the position of the prediction target coefficient than are the positions of the coefficients between which the interpolation process is performed.

Meanwhile, while the mean value of horizontally-aligned four pixels, which form one group, is adopted as an example of the filter coefficient, the above-mentioned prediction method is obviously efficient for other filter coefficients that represent other low-frequency components. The reason is that the problem in the prediction of a low-frequency component in the one-dimensional subband coding is that the distance between coefficients is far, or uneven.

For example, while the low-frequency component of one-dimensional DCT is the mean of eight pixels. Since the correlation with the coefficient of the immediately-above position is high, the weight of the coefficient C of the immediately-above position may be increased to so that $C$, $(1 \cdot A + 3 \cdot C)/(1+3)$, and $C + (1 \cdot A + 3 \cdot C)/(1+3) - (1 \cdot C + 3 \cdot B)/(1+3)$ are used as three candidates for the predicted value.

In addition, by using the second and third predicted value calculation modules (115 and 116), whether to use the addition with the filter coefficient value of the preceding line as the predicted value or to use zero as the predicted value without obtaining the addition is adaptively selected for the second and third filter coefficients, making it possible to increase the accuracy in predicting the second and third filter coefficients.

When the addition with the filter coefficient value of the preceding line is obtained only when the slants appear successively in the vertical direction, the image quality and compression efficiency increase as the prediction error becomes small, but in other cases, obtaining the addition may cause significant misprediction.

In this regard, the prediction accuracy can be increased by the following procedures. In the case where the prediction error was small when the addition was obtained at the time of the prediction of the coefficient value of the preceding line, it is determined that there are successive slants and the addition is obtained also at the time of the prediction of the coefficient value of the current line. On the contrary, in the case where the prediction error was smaller when zero was used as the predicted value without obtaining the addition at the time of the prediction of the coefficient value of the preceding line, it is determined that there is no successive slant in the vertical direction, and zero is used as the predicted value without obtaining the addition also at the time of the prediction of the coefficient value of the current line.

Meanwhile, while the filter coefficient representing the slant (i.e., high-frequency component) is adopted as an example of the filter coefficient here, the above-mentioned prediction method is obviously effective for a filter coefficient using a simple difference as the one used in Haar wavelet transform. The reason is that the problem in the prediction of the high-frequency component in the one-dimensional subband coding is that there is a prominent difference in whether or not the coefficient value appears successively.

In addition, by using the fourth predicted value calculation module (117), it becomes possible to calculate the predicted value for the fourth filter coefficient easily as well as to increase the prediction accuracy. Based on the SLT and taking the second row of the SLT matrix into consideration, the differential value of the two pixels in the middle of the horizontally-aligned four pixels is likely to be ⅓ (one third) of the differential value of the two pixels at the ends of the horizontally-aligned four pixels (i.e., the fourth filter coefficient is likely to be one third of the second filter coefficient) (when the prediction goes wrong, the value obtained by transform according to the fourth row in the SLT matrix is used).

For this reason, it becomes possible to calculate the predicted value for the fourth filter coefficient easily as well as to increase the prediction accuracy, by calculating the differential value, which corresponds to the second filter coefficient, of the two pixels at the ends of the horizontally-aligned four pixels first; and next, adopting the value being ⅓ (one third) of the calculated differential value (i.e., quantized value of the prediction error) of the two pixels at the ends as the predicted value for the differential value, which corresponds to the fourth filter coefficient, of the two pixels in the middle of the horizontally-aligned four pixels.

In addition, by using the number-of-level reduction modules (111), it becomes possible to hold the second, third, and fourth filter coefficients in the respective line memories.

As for the frequency of occurrence of the addition signals, those having a small absolute value tend to occur frequently because transition between pixels is smooth in most cases in a natural image. Therefore, it is possible to reduce the number of levels of the addition signal so that the addition signal may also be expressed with 256 gradations. Note that the addition signals discussed in this paragraph are those obtained by addition for predicting the coefficients defined as differential signals.

Meanwhile, while the coefficient values of the second, third, and fourth filter coefficients are adopted as examples here, the reduction method is obviously effective for other filter coefficients (especially ones representing the high-frequency component). This is because other differential signals also indicate a tendency that those having a small absolute value tend to occur frequently.

The image data compression apparatus of the above embodiment is not limited to be applied to an in-vehicle system or a mobile device, and may also be applied to various fields such as transmission systems of medical image data or satellite image data.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of the superiority and inferiority of the embodiments. Although the embodiments of the present invention have been described in detail, it should be understood that the various changes, substitutions, and alterations could be made hereto without departing from the spirit and scope of the invention.

What is claimed is:

1. An image data compression apparatus that compresses image data by one-dimensional subband coding, the image data compression apparatus comprising:
    a filter coefficient calculation unit configured
        to perform a filter process to separate a predetermined plurality of pixels extracted in accordance with the one-dimensional subband coding into a low-frequency component and a high-frequency component, and
        to calculate coefficient values of respective filter coefficients of the separated low-frequency component and the high-frequency component;
    a plurality of prediction units configured to perform different predictions respectively for the coefficient values of the respective filter coefficients calculated by the filter coefficient calculation unit;
    a predicted coefficient value calculation unit configured to calculate predicted coefficient values to be used for posterior predictions by calculating each of the predicted coefficient values from at least one of the predicted values having been predicted by a corresponding one of the plurality of prediction units and from at least one of the coefficient values of the respective filter coefficients that the filter coefficient calculation unit has calculated;
    a memory unit configured to hold the predicted coefficient values calculated by the predicted coefficient value calculation unit; and
    a compression coding unit configured
        to calculate a difference between each of the predicted values having been predicted by each of the plurality of prediction units and one of the coefficient values of the respective filter coefficients that the filter coefficient calculation unit has calculated, and
        to perform coding after quantizing the difference, or to perform coding using the difference.

2. The image data compression apparatus according to claim 1, wherein one of the plurality of prediction units for a filter coefficient of the low-frequency component in the respective filter coefficients adopts an intermediate value among three candidates $C$, $(m \cdot A + n \cdot C)/(m+n)$, and $C + (m \cdot A + n \cdot C)/(m+n) - (m \cdot C + n \cdot B)/(m+n)$ for a predicted value as the predicted value, where A, C, and B are respective coefficients of left, upper, and upper-left positions relative to a position of a prediction target coefficient, and m and n represent certain values other than zero.

3. The image data compression apparatus according to claim 1, wherein when at least one of the predicted coefficient values of the filter coefficients of the high-frequency component having been calculated by the predicted coefficient value calculation unit is held in the memory unit, a number of levels of an original pixel gradation value is reduced in accordance with an absolute value of the at least one of the predicted coefficient values that corresponds to the high-frequency component.

4. The image data compression apparatus according to claim 1, wherein at least a particular prediction unit of the plurality of prediction units that is for a filter coefficient of the high-frequency component in the respective filter coefficients includes:
    a prediction error judgment unit configured to judge whether a prediction error is smaller when a difference over a predicted coefficient value that is held when being calculated for a preceding line is obtained than when the difference is not obtained; and
    a coefficient holding unit configured
        to hold, in the memory unit, the calculated coefficient value of the filter coefficient as a predicted coefficient value to be used for a posterior prediction when the prediction error judgment unit judges that the prediction error is smaller when the difference is obtained, and
        to hold, in the memory unit, a predicted coefficient value not to be used for the posterior prediction when the prediction error judgment unit judges that the prediction error is smaller when the difference is not obtained; and
    the particular prediction unit adaptively outputs, as a predicted value, the predicted coefficient value held by the coefficient holding unit in accordance with a judgment result by the prediction error judgment unit in a current calculation of the predicted coefficient value of the filter coefficient.

5. The image data compression apparatus according to claim 4,
    wherein the filter process is performed in units of four pixels;
    wherein a first prediction unit in the plurality of prediction units for a first filter coefficient of the high-frequency component in the respective filter coefficients includes:
        a first filter coefficient predicted value calculation unit configured to calculate a differential value of two pixels at ends of the four pixels to adopt as a predicted value of the first filter coefficient;
        a first prediction error judgment unit configured to judge whether a prediction error is smaller when a difference over a predicted coefficient value that is held when being calculated by the first filter coefficient predicted value calculation unit for the preceding line is obtained than when the difference is not obtained; and
        a first coefficient holding unit configured
            to hold, in the memory unit, the calculated coefficient value of the filter coefficient as a predicted coefficient value to be used for a posterior prediction when the first prediction error judgment unit judges that the prediction error is smaller when the difference is obtained, and
            to hold, in the memory unit, a predicted coefficient value not to be used for the posterior prediction when the first prediction error judgment unit judges that the prediction error is smaller when the difference is not obtained; and
        the first prediction unit adaptively outputs, as a predicted value, the predicted coefficient value held by the first coefficient holding unit in accordance with a judgment result by the first prediction error judgment unit in a current calculation of the predicted coefficient value of the filter coefficient.

6. The image data compression apparatus according to claim 4, wherein the filter process is performed in units of four pixels;

wherein a second prediction unit in the plurality of prediction units for a second filter coefficient of the high-frequency component in the respective filter coefficients includes:

a second filter coefficient predicted value calculation unit configured to subtract pixel values of two pixels in a middle of the four pixels from an addition value of two pixels at ends of the four pixels to adopt as a predicted value of the second filter coefficient; and a second prediction error judgment unit configured to judge whether a prediction error is smaller when a difference over a predicted coefficient value that is held when being calculated by the second filter coefficient predicted value calculation unit for the preceding line is obtained than when the difference is not obtained; and a second coefficient holding unit configured
to hold, in the memory unit, the calculated coefficient value of the filter coefficient as a predicted coefficient value to be used for a posterior prediction when the second prediction error judgment unit judges that the prediction error is smaller when the difference is obtained, and
to hold, in the memory unit, a predicted coefficient value not to be used for the posterior prediction when the second prediction error judgment unit judges that the prediction error is smaller when the difference is not obtained; and the second prediction unit adaptively outputs, as a predicted value, the predicted coefficient value held by the second coefficient holding unit in accordance with a judgment result by the second prediction error judgment unit in a current calculation of the predicted coefficient value of the filter coefficient.

7. The image data compression apparatus according to claim 4, wherein the filter process is performed in units of four pixels; and a third prediction unit in the plurality of prediction units for a third filter coefficient of the high-frequency component in the respective filter coefficients adopts one third of a predicted value of a filter coefficient that is a differential value of two pixels at ends of the four pixels, as a predicted value of a differential value of two pixels in a middle of the four pixels.

8. A non-transitory computer-readable storage medium storing a program to cause a computer to execute a process for compressing image data by one-dimensional subband coding, the process comprising:

performing a filter process to separate a predetermined plurality of pixels extracted in accordance with the one-dimensional subband coding into a low-frequency component and a high-frequency component;

calculating coefficient values of respective filter coefficients of the separated low-frequency component and the high-frequency component;

performing a first prediction process for the calculated coefficient value of the filter coefficient of the low-frequency component;

performing a second prediction process, different from the first prediction process, for the calculated coefficient value of the filter coefficient of the high-frequency component;

calculating predicted coefficient values to be used for posterior predictions by calculating each of the predicted coefficient values from at least one of the predicted values having been predicted by the first or second prediction process for the low-frequency component or the high-frequency component, respectively, as well as from at least one of the calculated coefficient values of the filter coefficients of the low-frequency component or the high-frequency component;

holding the calculated predicted coefficient values;

calculating a difference between each of the predicted values and one of the coefficient values of the calculated coefficient values of the filter coefficients of the low-frequency component and the high-frequency component; and performing coding after quantizing the difference, or performing coding using the difference.

9. An image data decoding apparatus that decodes compressed image data compressed by an image data compression apparatus that compresses original image data by one-dimensional subband coding, the image data decoding apparatus comprising:

a predictor configured
to perform a filter process to separate a predetermined plurality of pixels extracted in accordance with the one-dimensional subband coding into a low-frequency component and a high-frequency component,
to calculate coefficient values of respective filter coefficients of the separated low-frequency component and the high-frequency component, and
to include prediction units configured to perform different predictions respectively for the coefficient values, wherein
the image data decoding apparatus obtains a coefficient predicted value for a next filter coefficient by adding a predicted value extracted from the predictor and a quantized value of a prediction error obtained through an inverse coder and an inverse quantizer from the compressed image data,
the image data decoding apparatus decodes coefficient values of the respective filter coefficients of the low-frequency component and the high-frequency component, and
the image data decoding apparatus performs an inverse filter process to decode a decoding target pixel group corresponding to the predetermined plurality of pixels extracted in accordance with the one-dimensional subband coding, to obtain the original image data.

* * * * *